US008013866B2

(12) United States Patent
Yoshida et al.

(10) Patent No.: US 8,013,866 B2
(45) Date of Patent: Sep. 6, 2011

(54) IMAGE DISPLAY SYSTEM, IMAGE DISPLAY APPARATUS, IMAGE PROVIDING APPARATUS AND METHOD THEREOF

(75) Inventors: Naofumi Yoshida, Yokohama (JP); Kosuke Takano, Fujisawa (JP); Shuichi Kurabayashi, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 12/665,153

(22) PCT Filed: Mar. 17, 2009

(86) PCT No.: PCT/JP2009/055107
§ 371 (c)(1),
(2), (4) Date: Mar. 17, 2010

(87) PCT Pub. No.: WO2010/106631
PCT Pub. Date: Sep. 23, 2010

(65) Prior Publication Data
US 2011/0050717 A1    Mar. 3, 2011

(51) Int. Cl.
*G09G 5/02* (2006.01)
(52) U.S. Cl. ......................... 345/589; 382/168
(58) Field of Classification Search ........... 345/589–605
See application file for complete search history.

(56) References Cited

U.S. PATENT DOCUMENTS

| | | | | |
|---|---|---|---|---|
| 5,721,904 A | * | 2/1998 | Ito et al. | 707/769 |
| 5,999,664 A | * | 12/1999 | Mahoney et al. | 382/305 |
| 6,285,788 B1 | * | 9/2001 | Sezan et al. | 382/217 |
| 6,510,469 B1 | * | 1/2003 | Starnes et al. | 709/247 |
| 6,512,850 B2 | * | 1/2003 | Yaung | 382/225 |
| 6,621,926 B1 | * | 9/2003 | Yoon et al. | 382/168 |
| 6,928,424 B2 | * | 8/2005 | Honda | 709/217 |
| 7,006,714 B2 | * | 2/2006 | Kasutani | 382/305 |
| 7,062,083 B2 | * | 6/2006 | Lim et al. | 382/164 |
| 7,236,632 B2 | * | 6/2007 | Erol et al. | 382/218 |
| 2003/0039398 A1 | * | 2/2003 | McIntyre | 382/239 |

FOREIGN PATENT DOCUMENTS

| | | |
|---|---|---|
| JP | 2001-160062 | 6/2001 |
| JP | 2002-099914 | 4/2002 |
| JP | 2002-230574 | 8/2002 |

(Continued)

OTHER PUBLICATIONS

Kurabayashi, Shuichi et al., "Active Multidatabase System for Mobile Computing Environment," *Information Processing Society of Japan*, The Special Interest Group Technical Reports of IPSJ 2000-DBS-122, 2000, pp. 463-470 (with English abstract).

(Continued)

*Primary Examiner* — Xiao M Wu
*Assistant Examiner* — Charles Tseng
(74) *Attorney, Agent, or Firm* — Foley & Lardner LLP

(57) ABSTRACT

An image display apparatus disclosed in the present application is made up of an analytical precision calculating module, an image analyzing module, and an image providing module. The analytical precision calculating module calculates an analytical precision of an image which satisfies a designated restrictive condition. The image analyzing module analyzes image information based on the calculated analytical precision. The image providing module accepts an image designation, calculates differences between an analysis result of image information of the designated image and image information of images other than the designated image, and provides a list of images arranged in an ascending order of differences thereof as a search result.

15 Claims, 19 Drawing Sheets

FOREIGN PATENT DOCUMENTS

| | | |
|---|---|---|
| JP | 2004-265067 | 9/2004 |
| JP | 2008-097465 | 4/2008 |
| JP | 2008-210003 | 9/2008 |

OTHER PUBLICATIONS

Kurabayashi, Shuichi et al., "A Multidatabase System Architecture for Integrating Heterogeneous Databases with Meta-Level Active Rule Primitives," *Proceedings of the 20th IASTED International Conference on Applied Informatics*, 2002, pp. 378-387.

Notice of Reasons for Rejection for JP 2009-545030 mailed Dec. 16, 2009 (with English translation).

Office Action for Japanese Patent Application No. 2009-545030 mailed May 6, 2010 (with English translation).

* cited by examiner

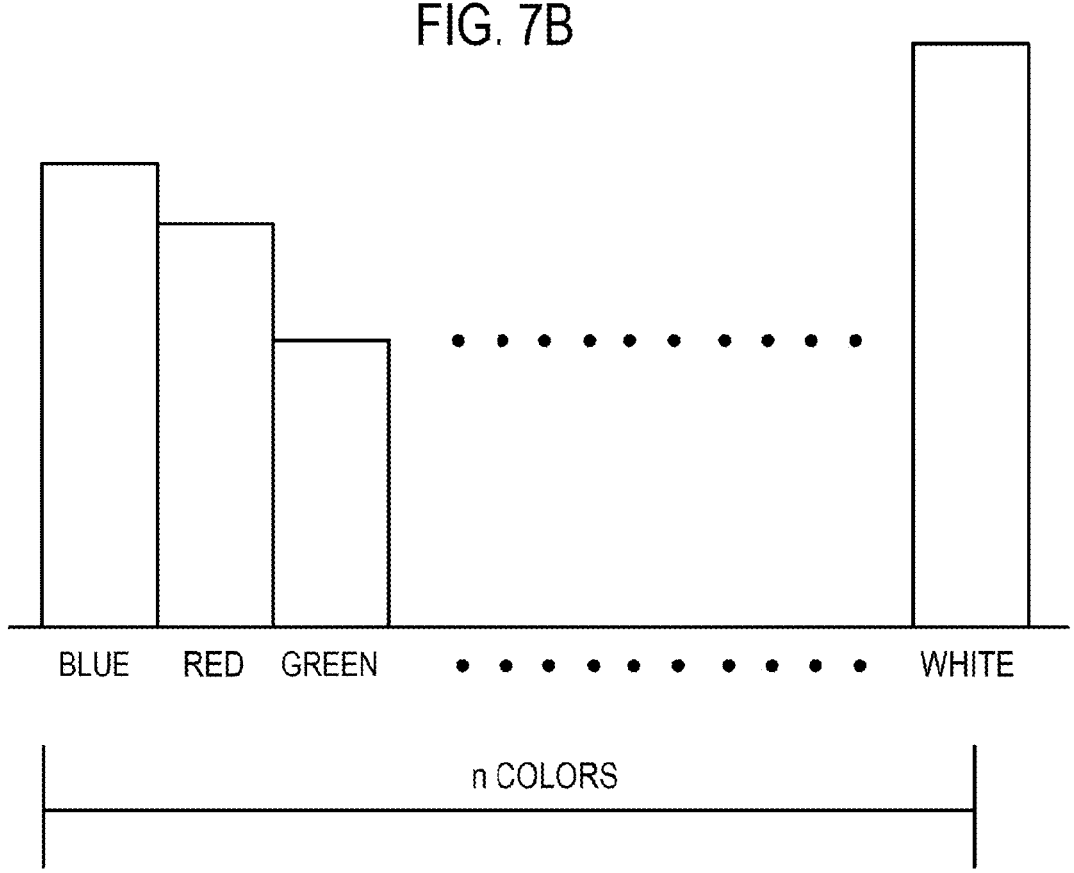

FIG. 8

| IMAGE IDENTIFIER | COLOR DIFFERENCE AMOUNT | TIME DIFFERENCE AMOUNT | POSITIONAL DIFFERENCE AMOUNT | IMAGE DATA |

IMAGE DISPLAY SYSTEM, IMAGE DISPLAY APPARATUS, IMAGE PROVIDING APPARATUS AND METHOD THEREOF

CROSS-REFERENCE TO RELATED APPLICATIONS

The present application is a U.S. national stage application claiming the benefit of International Application No. PCT/JP2009/055107, filed on Mar. 17, 2009, the entire contents of which is incorporated herein by reference in its entirety.

TECHNICAL FIELD

The present application discloses an image display system, an image display apparatus, an image providing apparatus, and a method thereof.

BACKGROUND ART

For example, Non-Patent Documents 1 and 2 disclose an active meta-level system that dynamically interconnects devices such as databases.
Non-Patent Document 1: Shuichi Kurabayashi, Naoki Ishibashi, Yasushi Kiyoki: "Active Multidatabase System for Mobile Computing Environment", Information Processing Society of Japan SIG Notes 2000-DBS-122, 2000, 463-470.
Non-Patent Document 2: Shuichi Kurabayashi, Naoki Ishibashi, Yasushi Kiyoki: A Multidatabase System Architecture for Integrating Heterogeneous Databases with Meta-Level Active Rule Primitives. In Proceedings of the 20th IASTED International Conference on Applied Informatics, 2002, 378-387.

DISCLOSURE OF THE INVENTION

Means for Solving the Problems

An image display apparatus disclosed in the present application has been invented in consideration of such background, and an embodiment thereof is an image display apparatus that displays one or more pieces of image information respectively including one or more components, the image display apparatus including: a calculating module that calculates an analytical precision satisfying a restrictive condition designated for the provision of the one or more pieces of image information; an analyzing module that analyzes the respective components of the image information at the calculated analytical precision; and a providing module that receives an image designation and a component designation, and creates and displays provision information in which image information other than the designated image is arranged in an order of analysis results thereof of nearest to farthest from the image information of the designated image.

SUMMARY

An outline of the disclosure of the present application will now be described.

However, the present description is merely intended to assist in the understanding of the disclosure of the present application and is not intended to limit the technical scope thereof.

Significant improvements have been made in the CPU capability and the storage capacity of mobile devices such as mobile phones and PDAs (personal digital assistants), thereby enabling saving and operating multimedia data such as images and music in the mobile devices.

However, since such mobile devices generally lack sufficient computational resources as compared to conventional computer systems, accessing multimedia data requires a large amount of time.

An image display apparatus disclosed in the present application has been invented in consideration of the perspective described above, and is configured so as to: calculate an analytical precision of an image so as to satisfy a designated restrictive condition; analyze one or more images at the calculated analytical precision; and when displaying an designated image among the one or more images together with images other than the designated image, arrange the images in an order of analysis results of the images of nearest to farthest from the designated image.

The technical advantages disclosed in the present application as well as other technical advantages will be readily apparent to one skilled in the art by reading the detailed descriptions of the embodiments illustrated in the drawings.

The accompanying drawings, which are incorporated in and constitute a part of the specification of the present application, illustrate embodiments of the disclosure of the present application and together with the descriptions, serve to explain the principles of the disclosure of the present application.

It is to be understood that, unless otherwise noted, the drawings referred to in the specification of the present application are not drawn to a constant scale.

BRIEF DESCRIPTION OF THE DRAWINGS

The configurations and operations of the embodiments disclosed in the present application are best understood by reference to the following detailed description when read in conjunction with the accompanying drawings.

FIG. 8 is a diagram illustrating difference data to be created by a difference calculating unit;

BEST MODE FOR CARRYING OUT THE INVENTION

Hereinafter, embodiments disclosed in the present application will be described in detail.

The embodiments disclosed in the present application are exemplified in the accompanying drawings.

While the disclosure of the present application will be described with respect to the embodiments, the embodiments are not intended to limit the disclosure of the present application to the contents disclosed in the embodiments as would be understood by one skilled in the art.

On the contrary, the disclosure of the present application is intended to cover all alternatives, modifications and equivalents as may be included within the spirit and scope of the disclosure of the present application defined in the appended claims.

In addition, the description of the disclosure of the present application will be given with sufficient specificity and detail so as to ensure that the disclosure of the present application be understood.

However, as would be understood by one skilled in the art, implementations of the disclosure of the present application need not necessarily require the use of all items described with such specificity and detail.

Moreover, known methods, procedures, components and circuits may not necessarily be described in detail herein so as to avoid making the aspects of the present disclosure vague.

It should be kept in mind, however, that these and similar terms are to be associated with appropriate physical quantities and are merely convenient labels applied to these quantities.

As is apparent from the arguments below, unless specifically stated otherwise, it is appreciated that throughout the disclosure of the present application, arguments using terms such as "accepting" and "setting" refer to actions and processes of an electronic computing device such as a computer system.

An electronic computing device such as a computer system manipulates and converts data expressed as a physical (electronic) quantity in a register and a memory of the computer system into other data similarly expressed as a physical quantity residing in a computer system memory or register or other similar information storage, transmission, or display devices.

Furthermore, the disclosure of the present application is also suitable in other computer systems such as an optical computer and a mechanical computer.

[Image Display System 1]

Hereinafter, an image display system 1 will be described to which the disclosure of the present application is to be applied.

Figure 1:
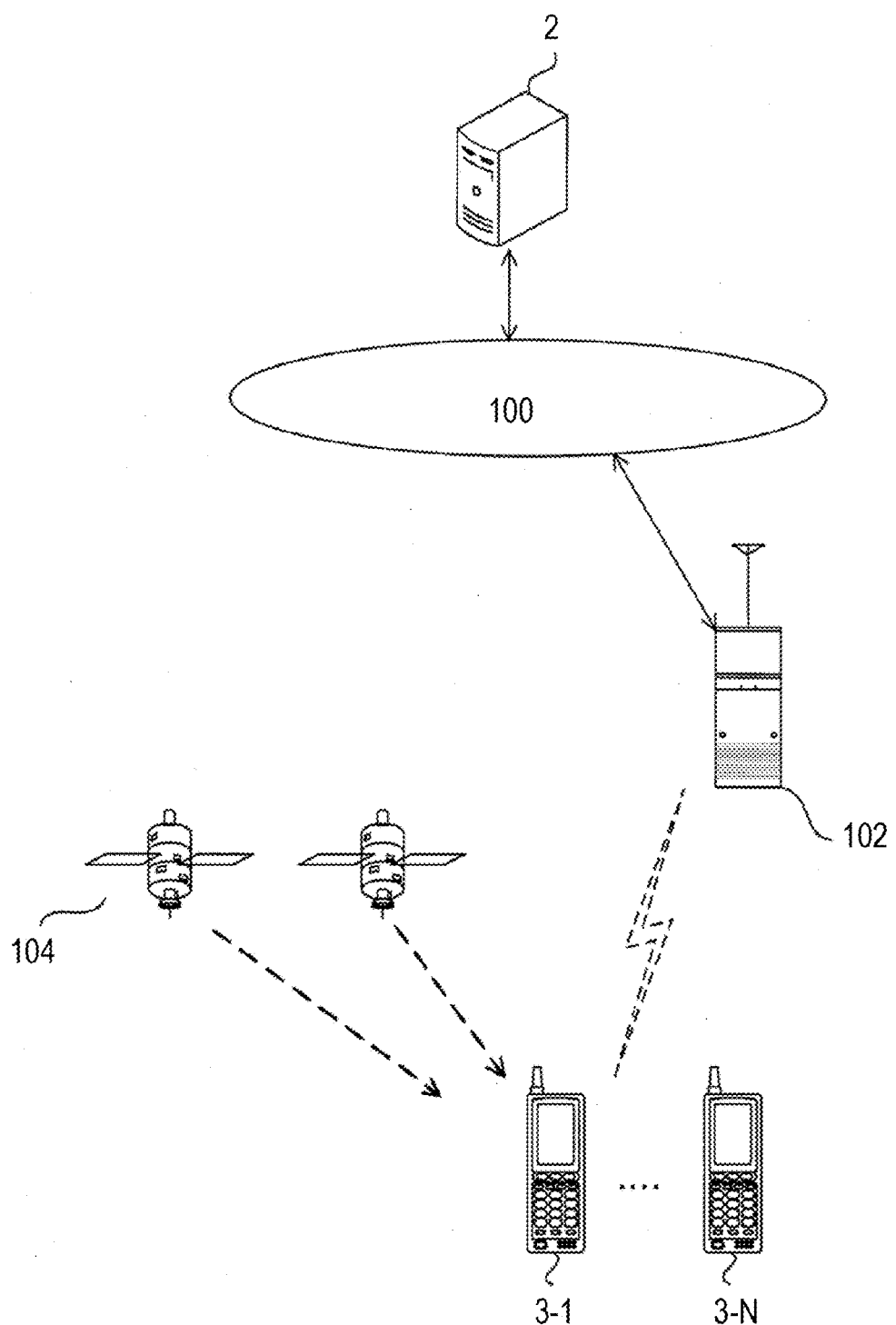
FIG. 1 is a diagram illustrating a configuration of an image display system to which the disclosure of the present application is applied.

FIG. 1 is a diagram illustrating a configuration of the image display system 1 to which the disclosure of the present application is applied.

As illustrated in FIG. 1, the image display system 1 is configured such that an image providing server 2, terminals 3-1 to 3-N that are mobile phones, PDAs (personal digital assistants) capable of wireless communication, portable personal computers or the like, and a base station 102 that performs data transmission among the terminals 3-1 to 3-N via a wireless line, are connected via a network 100 that accommodates both wired and wireless communication.

In addition, the terminals 3-1 to 3-N are capable of receiving a radio wave signal for position detection from a GPS (global positioning system) satellite 104 at a location suitable for radio reception such as the outside.

Although N denotes an integer equal to or greater than 1, N does not necessarily always denote the same number.

In addition, when describing any one or more of a plurality of components such as the terminals 3-1 to 3-N, a simple abbreviation such as terminal 3 may be used.

Furthermore, components capable of becoming information communication and information processing entities such as the base station 102, the image providing server 2 and the terminal 3 may be collectively referred to as nodes.

The terminal 3 need not necessarily be a mobile terminal and may include a desktop computer that communicates with the network 100.

Moreover, hereinafter, substantially like components are to be assigned like reference numerals in the respective diagrams.

The image display system 1 uses these components to realize information processing at nodes and information communication between nodes.

[Hardware Configuration]

Hereinafter, hardware configurations of the respective nodes of the image display system 1 will be described.

Figure 2:
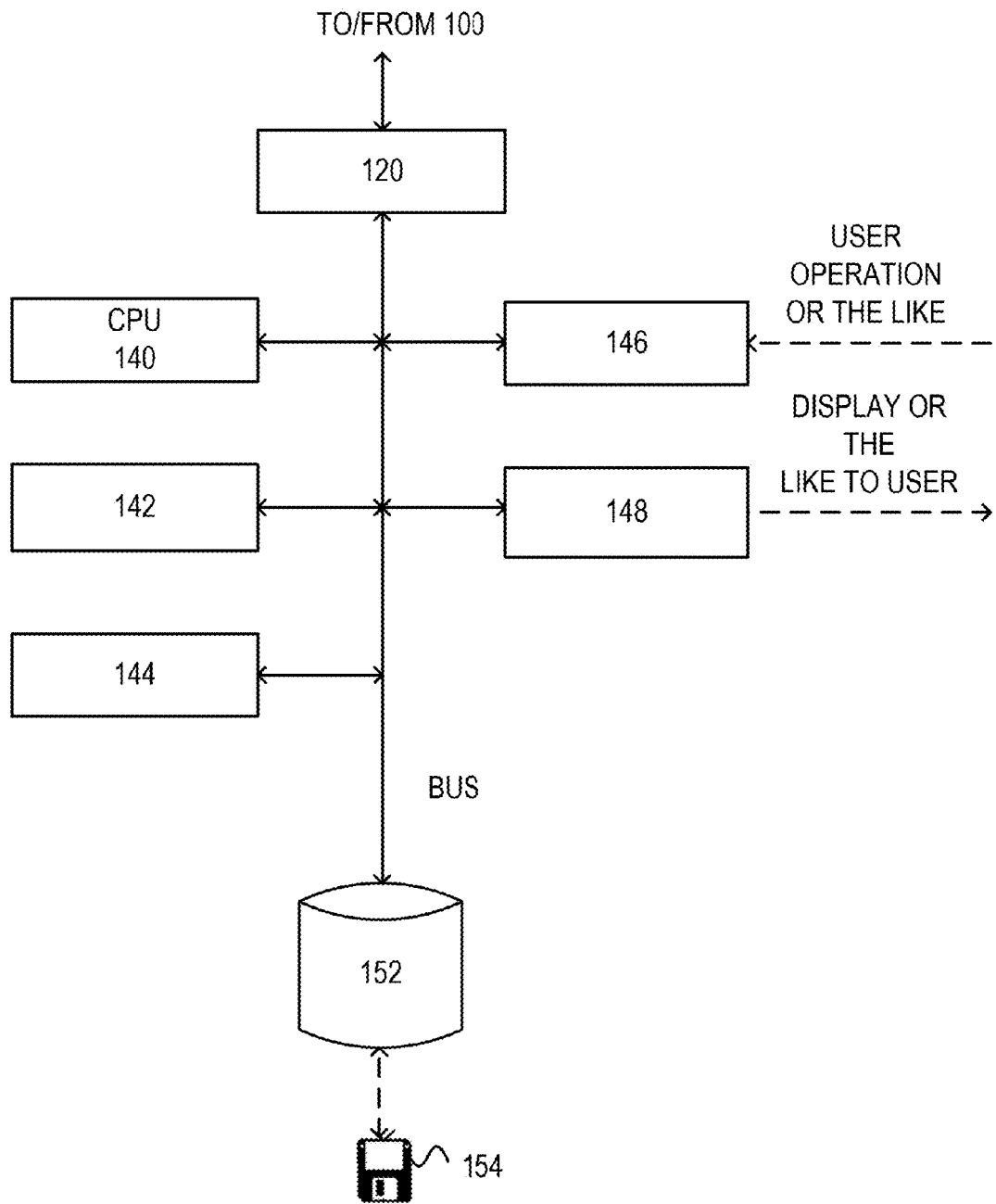
FIG. 2 is a diagram illustrating a hardware configuration of an image providing server illustrated in FIG. 1.

FIG. 2 is a diagram illustrating a hardware configuration of the image providing server 2 illustrated in FIG. 1.

As illustrated in FIG. 2, the image providing server 2 is made up of: a communication apparatus 120 to be connected to the network 100 via a wireless communication line or a wired communication line; a CPU 140; a memory 142; a CPU peripheral 144 such as an interrupt control device, a timer device, and a recording medium interface that reads/writes data from/to a recording medium 154; an input device 146 such as a keyboard and a mouse; an output device 148 such as a display and a speaker; and a recording apparatus 152 such as an HDD or CD apparatus.

In other words, the image providing server 2 includes components of a general computer capable of performing information processing and information communication.

Figure 3:
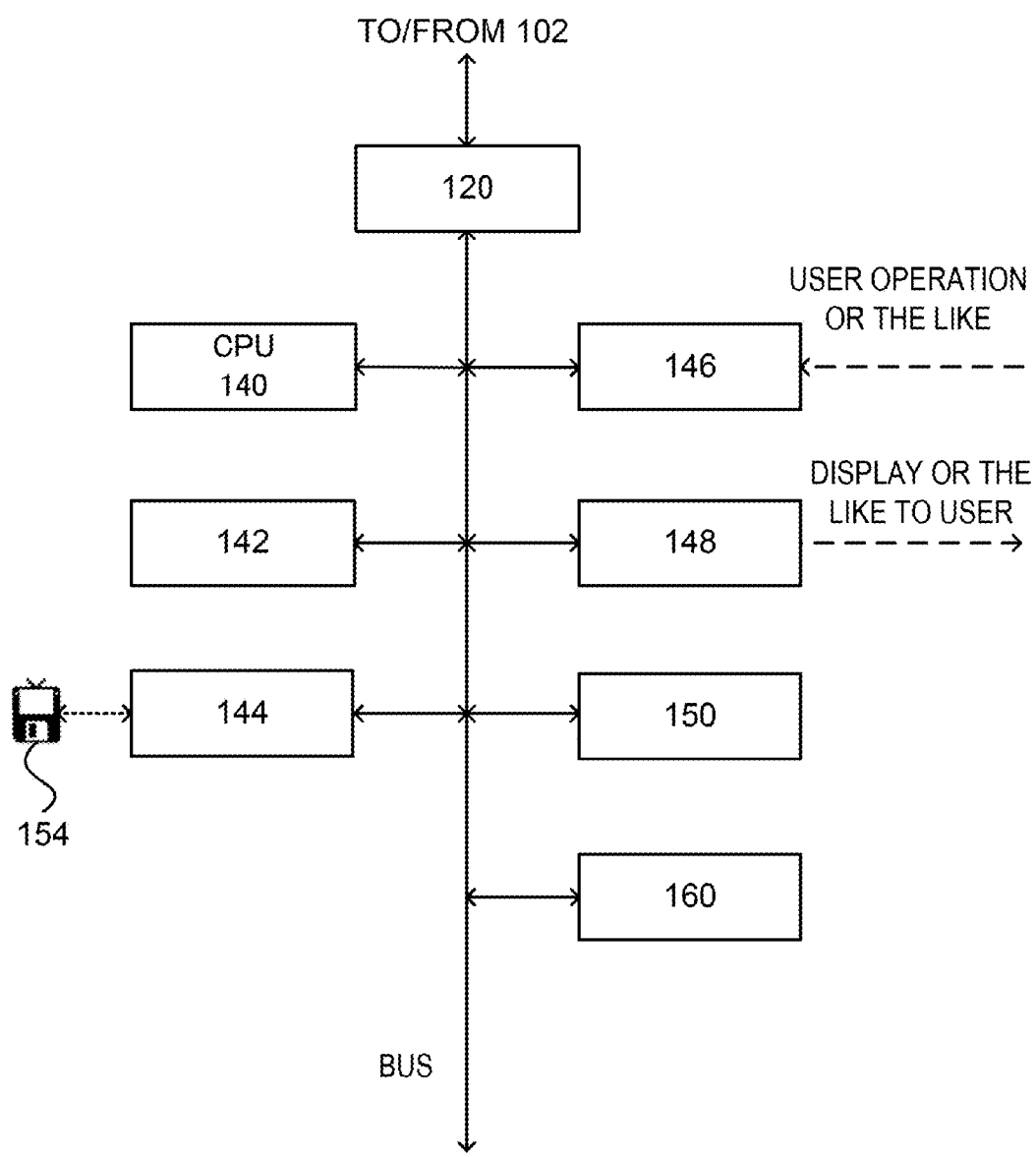
FIG. 3 is a diagram illustrating a hardware configuration of a terminal illustrated in FIG. 1.

FIG. 3 is a diagram illustrating a hardware configuration of the terminal 3 illustrated in FIG. 1.

As illustrated in FIG. 3, the terminal 3 is made up of: a communication apparatus 120 to be connected to the network 100 via a wireless communication line or a wired communication line; a CPU 140; a memory 142; a CPU peripheral 144 such as an interrupt control device, a timer device, and a recording medium interface that reads/writes data from/to a recording medium 154; an input device 146 such as a numerical keypad and a microphone; an output device 148 such as a liquid crystal display and a speaker; a camera 150; and a GPS 160 that detects a position (longitude and latitude) of the terminal 3 or the like using a radio signal from the GPS satellite 104 (FIG. 1).

In other words, the terminal 3 includes components of a general computer capable of performing information processing and information communication.

First Embodiment

Next, a first embodiment of the disclosure of the present application will be described.

[Image Providing Server Program 20]

Figure 4:
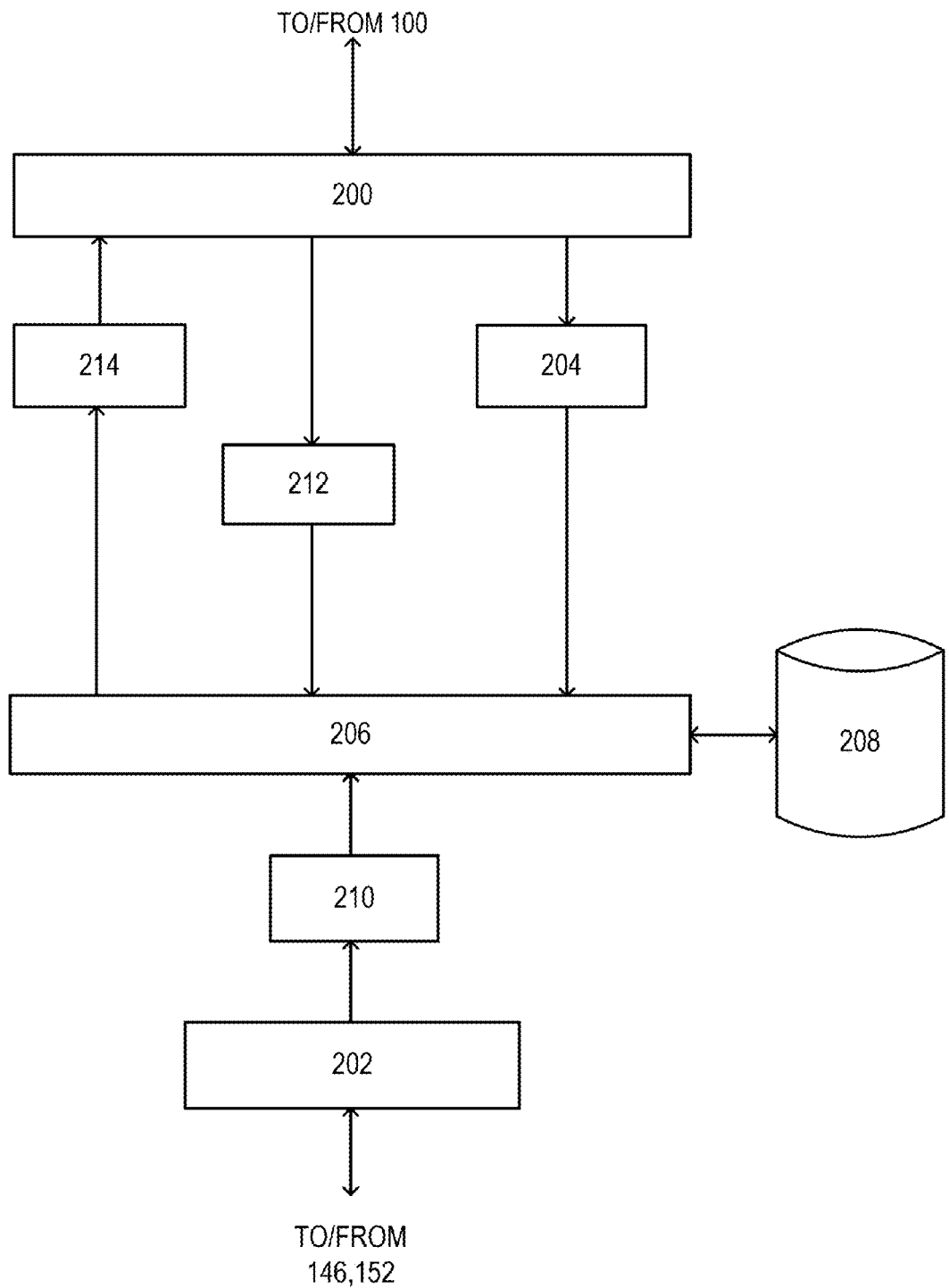
FIG. 4 is a diagram illustrating an image providing server program to be executed at the image providing server illustrated in FIGS. 1 and 2.

FIG. 4 is a diagram illustrating an image providing server program 20 to be executed at the image providing server 2 illustrated in FIGS. 1 and 2.

As illustrated in FIG. 4, the image providing server program 20 includes a communication processing unit 200, a user interface unit (UI) 202, an image receiving unit 204, an image information managing unit 206, an image database (DB) 208, an image inputting unit 210, an image request receiving unit 212, and an image transmitting unit 214.

The image providing server program 20 is loaded on to the memory 142 of the image providing server 2 via the recording medium 154 (FIGS. 2 and 3), the network 100 and the like, and is executed specifically using hardware resources of the image providing server 2 on an OS (not illustrated) that runs on the image providing server 2 (the same logic will apply to the following programs and modules).

Using these components, the image providing server program 20 receives image information, to be described later, from the network 100 or the like, manages the image information, and transmits the image information in response to a request from the network 100.

In the image providing server program 20, the communication processing unit 200 performs processing for general information communication to be performed by the image providing server 2 and processing for information communication with the terminal 3 via the network 100.

The UI 202 accepts a user operation on the input device 146 and outputs data indicating the accepted operation to the image inputting unit 210.

In addition, the UI 202 controls processing to be performed by other components of the image providing server program 20.

The image receiving unit 204 receives image information from the network 100 and outputs the same to the image information managing unit 206.

The image inputting unit 210 accepts, via the UI 2020, image information accepted by the recording apparatus 152 via the recording medium 154, and outputs the image information to the image information managing unit 206.

The image information managing unit 206 stores image information accepted from the image receiving unit 204 and the image inputting unit 210 into the image DB 208, and manages the image information.

The image request receiving unit 212 accepts information indicating a request for image information (image request information) from the network 100, and outputs the information to the image information managing unit 206.

The image information managing unit 206 acquires image information corresponding to the image request information from the image DB 208, and outputs the image information to the image transmitting unit 214.

The image transmitting unit 214 transmits the image information to the node having transmitted the image request information via the communication processing unit 200 and the network 100.

Figure 5:
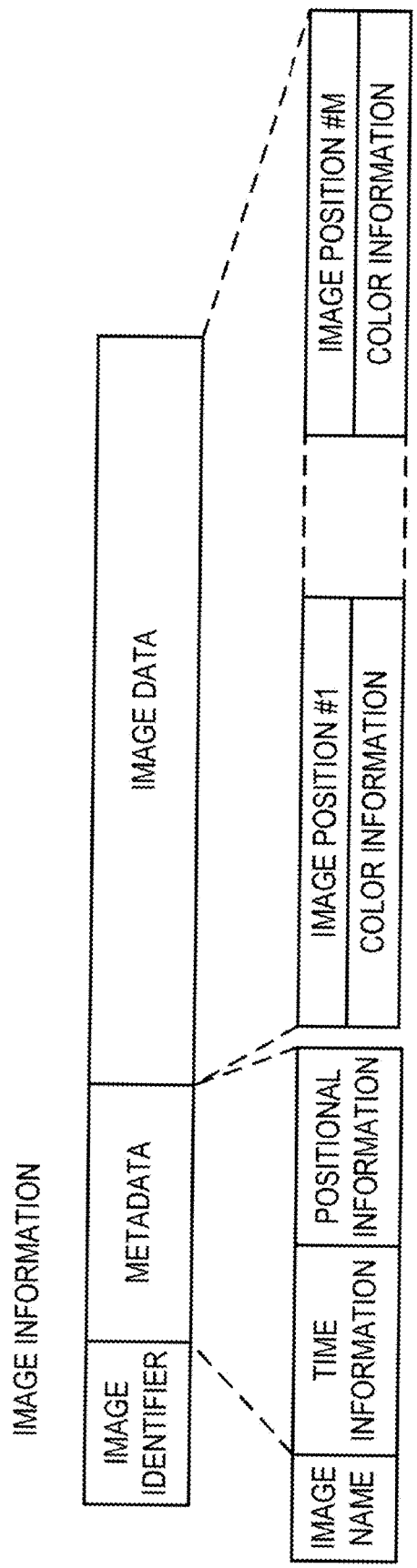
FIG. 5 is a diagram illustrating a structure of image information.

FIG. 5 is a diagram illustrating a structure of image information stored by the image information managing unit 206.

As illustrated in FIG. 5, image information includes an image identifier, metadata, and image data.

Metadata is data regarding image data, and includes: an image name; information (time information) regarding the time at which the image data was created (for example, the time of photography of an image corresponding to the image data); and information (positional information) regarding a position at which the image was created (for example, the position where the image was photographed).

In this case, positional information can be acquired by, for example, the GPS 160 of the terminal 3 to be associated with a photographed image.

Image data includes: information indicating image positions #1 to #M (where M denotes an integer equal to or greater than 1 but does not necessarily always denote the same number) which are coordinate positions of, for example, pixels; and information (color information) regarding colors corresponding to the image positions.

[Terminal Program 30]

Figure 6:
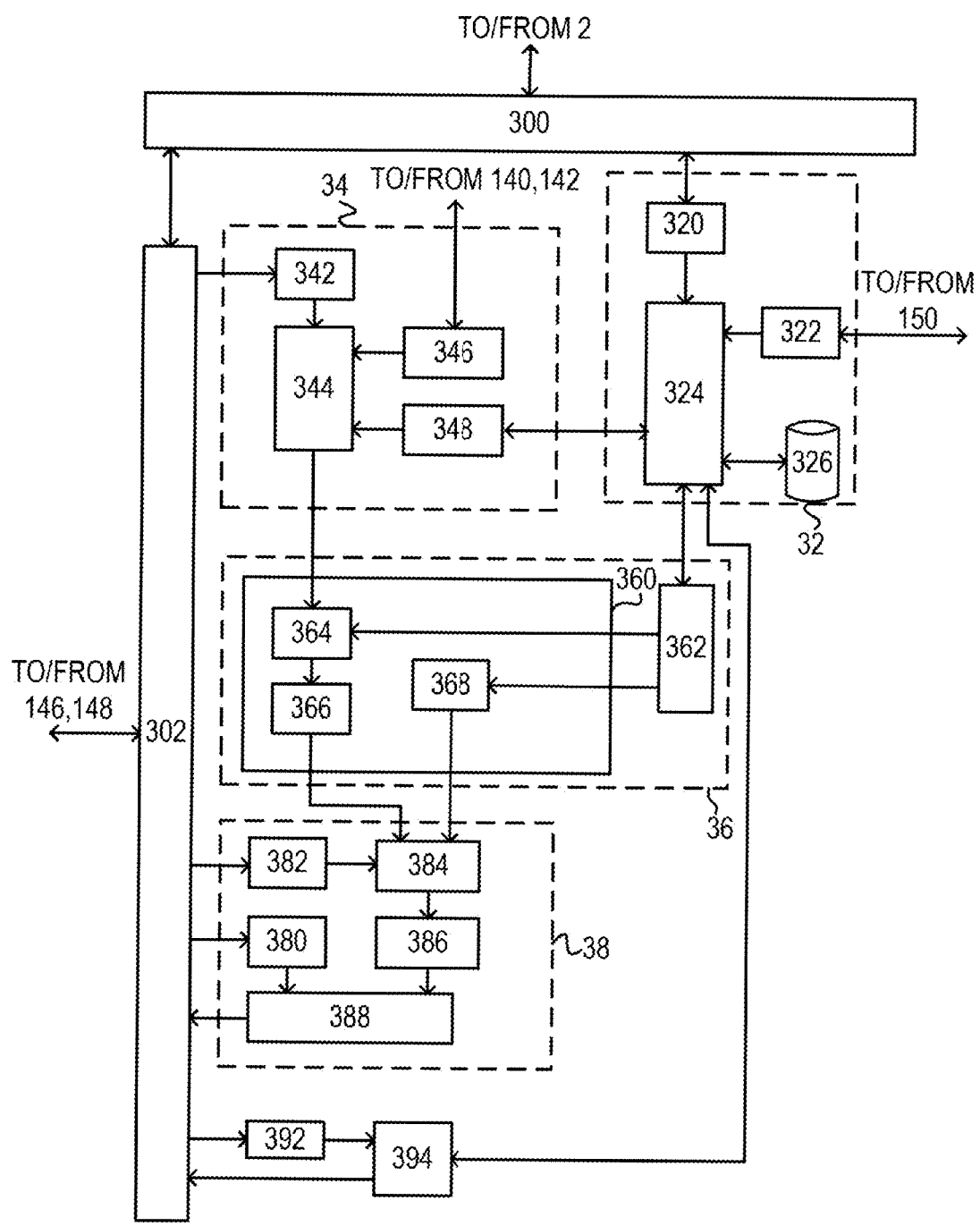
FIG. 6 is a diagram illustrating a terminal program to be executed at the terminal illustrated in FIGS. 1 and 3.

FIG. 6 is a diagram illustrating a terminal program 30 to be executed at the terminal 3 illustrated in FIGS. 1 and 3.

As illustrated in FIG. 6, the terminal program 30 includes a communication processing unit 300, a UI 302, an image storing module 32, an analytical precision calculating module 34, an image analyzing module 36, an image providing module 38, an image selecting unit 392, and a detailed image display processing unit 394.

Using these components, the terminal program 30 calculates an analytical precision of an image so as to satisfy a designated restrictive condition, and analyzes one or more images at the calculated analytical precision.

In addition, when displaying a designated image among the one or more images together with images other than the designated image, the terminal program 30 arranges the images in an order of analysis results of the images of nearest to farthest from the designated image.

In the terminal program 30, the communication processing unit 300 performs processing for audio communication and general information communication at the terminal 3 and processing for information communication with the image providing server 2 via the network 100.

The UI 302 displays an image (not illustrating) which prompts the user to input a restrictive condition, to be described later, designate an image, select a component of the image, and select the image on, for example, a display apparatus of the output device 148.

The UI 302 accepts operations made by the user in response to displayed GUI images from the input device 146, and outputs information corresponding to each operation to each corresponding module.

In addition, the UI 302 outputs an audio signal inputted from the microphone of the input device 146 to the communication processing unit 222, and outputs an audio signal inputted from the communication processing unit 300 to the speaker of the output device 148.

The image storing module 32 is made up of an image acquiring unit 320, a camera processing unit 322, an image information managing unit 324, and an image DB 326.

Using these components, the image storing module 32 acquires image information (FIG. 5) as a result of a user operation or the like, manages the image information, and outputs the image information in response to a request from another module.

The analytical precision calculating module 34 is made up of a restrictive condition inputting unit 342, an image analytical precision calculating unit 344, a processing capacity detecting unit 346, and an image-count detecting unit 348.

Using these components, the analytical precision calculating module 34 calculates an analytical precision of an image which satisfies a designated restrictive condition.

The image analyzing module 36 is made up of an image information acquiring unit 362 and an image component extracting unit 360.

Using these components, the image analyzing module 36 analyzes image information based on a calculated analytical precision.

The image providing module 38 is made up of an image component selecting unit 380, an image designating unit 382, a difference calculating unit 384, an image sequence creating unit 386, and an image provision processing unit 388.

Using these components, the image providing module 38 accepts an image designation, calculates differences between an analysis result of image information of the designated image and image information of images other than the designated image, and provides a list of images arranged in an ascending order of differences of the images as a search result.

At the image storing module 32, the image acquiring unit 320 transmits image request information to the image providing server 2 via the communication processing unit 300 and the network 100, and in response to the request, receives image information transmitted from the image providing server 2.

In addition, the image acquiring unit 320 outputs received image information to the image information managing unit 324.

The camera processing unit 322 acquires image data photographed by the camera 150, the time at which the image data was photographed, and a position at which the image data was photographed in association with each other and creates image information, and outputs the image information to the image information managing unit 324.

The image information managing unit 324 stores image information accepted from the image acquiring unit 320, the camera processing unit 322, and the recording medium 154 in the image DB 326, and manages the image information.

In addition, the image information managing unit 324 acquires image information from the image DB 326 in response to a request from another module, and outputs the image information to the module having made the request.

At the analytical precision calculating module 34, the restrictive condition inputting unit 342 performs processing so as to display a screen to be used by the user to input a restrictive condition on the output device 148 that is a liquid crystal screen or the like via the UI unit 302, and to enable input of a restrictive condition using the input device 146 that is a numerical keypad or the like.

In addition, the restrictive condition inputting unit 342 outputs information (restrictive condition information) regarding the restrictive condition inputted by a user operation to the image analytical precision calculating unit 344.

In this case, a restrictive condition refers to a restriction imposed from the moment the user requests an image search to the moment a desired image search result is displayed on the terminal 3, and includes, for example, a time limit, a power consumption, and a display screen size.

When the restrictive condition is a time limit, a period of time from the moment the user requests an image search to the moment a desired image search result is displayed on the terminal 3 is to be set by a user operation.

When the restrictive condition is a power consumption, power to be consumed from the moment the user requests an image search to the moment a desired image search result is displayed on the terminal 3 is to be set by a user operation.

If the restrictive condition is a display screen size, a size of a display screen when a desired image search result is displayed on the terminal 3 is to be set by a user operation.

The restrictive condition inputting unit 342 may be arranged so as to cause any of a time limit, a power consumption, and a display screen size to be selected as a restrictive condition.

For example, the restrictive condition inputting unit 342 displays a screen that enables selection of "time limit", "power consumption" or "display screen size" on the output device 148.

When "time limit" is selected by a user operation, the restrictive condition inputting unit 342 displays a screen for inputting or selecting a time limit.

When a time limit is inputted or selected by a user operation, the restrictive condition inputting unit 342 accepts time information as a restrictive condition information.

By accessing the CPU 140, the memory 142, and the like, the processing capacity detecting unit 346 detects a current processing capacity of the terminal 3.

In addition, the processing capacity detecting unit 346 outputs information (processing capacity information) regarding the detected processing capacity to the image analytical precision calculating unit 344.

The image-count detecting unit 348 outputs a signal for detecting the number of pieces of image information stored in the image DB 326 to the image information managing unit 324.

In response to the signal from the image-count detecting unit 348, the image information managing unit 324 detects the number of pieces of image information stored in the image DB 326, and outputs information (image-count information) indicating the number thereof to the image-count detecting unit 348.

The image-count detecting unit 348 outputs the image-count information from the image information managing unit 324 to the image analytical precision calculating unit 344.

The image analytical precision calculating unit 344 uses the accepted restrictive condition information, processing capacity information, and image-count information to calculate a precision of image analysis (image analytical precision) necessary for searching an image.

In addition, the image analytical precision calculating unit 344 outputs the calculated image analytical precision to the image analyzing module 36.

In this case, an image analytical precision refers to a fineness (degree) when analyzing image information and determines the accuracy of a degree of similarity (difference) when comparing a piece of image information with another piece of image information.

For example, when precision is high, a finer analysis result is obtained. Consequently, when searching for image information similar to image information A, it is more likely that image information similar to the image information A will be retrieved.

At the same time, a higher precision results in a greater throughput. In other words, the time necessary for processing increases.

For example, when image analysis involves analyzing color, the level of image analytical precision can be determined by controlling chromatic resolution (chromatic depth).

An example will be shown below of a case where time limit is selected as a restrictive condition and a level of chromatic resolution (chromatic depth) is adopted as an image analytical precision.

If m denotes the number of pieces of image information (images), n denotes chromatic resolution, Pt denotes a computation time per color per image (including the time required by processing performed by the image providing module 38), $\Delta t$ denotes the time required for processing other than image analysis (for example, the processing time regarding the display device 148), and T denotes a time limit designated by the user, then the following expression is true.

$$m*Pt*n+\Delta t \leq T \quad \text{(Expression 1)}$$

In this case, if m=100, Pt=0.001 [seconds], T=3 [seconds], and Δt=0, then n is calculated to be 30.

In other words, in the case described above, setting chromatic resolution to 30 will suffice to set the period of time required from the moment the user requests an image search to the moment a desired image search result is displayed on the terminal 3 to 3 seconds.

Alternatively, Pt may denote a function of the current processing capacity of the terminal 3.

Moreover, image analytical precision may be applied to image display in addition to image analysis.

At the image analyzing module 36, the image information acquiring unit 362 outputs a signal for acquiring image information stored in the image DB 326 to the image information managing unit 324.

In response to the signal from the image information acquiring unit 362, the image information managing unit 324 outputs image information stored in the image DB 326 to the image information acquiring unit 362.

In this manner, the image information acquiring unit 362 acquires image information from the image information managing unit 324.

The image component extracting unit 360 extracts an image component from the image information acquiring unit 362, and performs an image analysis according to the image component.

Image analysis is performed so as to enable calculation of a difference between a piece of image information and another piece of image information.

In this case, an image component refers to a component indicating a characteristic of image information and is, for example, color information, time information, and positional information.

The image component extracting unit 360 is made up of, for example, a color classifying unit 364, a color percentage calculating unit 366, and a metadata acquiring unit 368.

The metadata acquiring unit 368 acquires metadata (time information, positional information) from the image information acquiring unit 362 and outputs the metadata to the image providing module 38.

The color classifying unit 364 acquires image information from the image information acquiring unit 362 and classifies, for each piece of image information, used colors according to a chromatic resolution n calculated by the image analytical precision calculating unit 344.

For instance, since n=30 is set in the example described above, used colors are classified into 30 colors for each piece of image information.

For each piece of image information, the color percentage calculating unit 366 calculates a percentage (color percentage) at which classified colors are used in the image, and creates an n-color histogram for each image.

For example, the percentage of a portion classified as "blue" is calculated to be 16% and the percentage of a portion classified as "red" is calculated to be 12%.

In addition, the color percentage calculating unit 366 outputs information (color percentage information) regarding calculated color percentages to the image providing module 38.

Figure 7A:
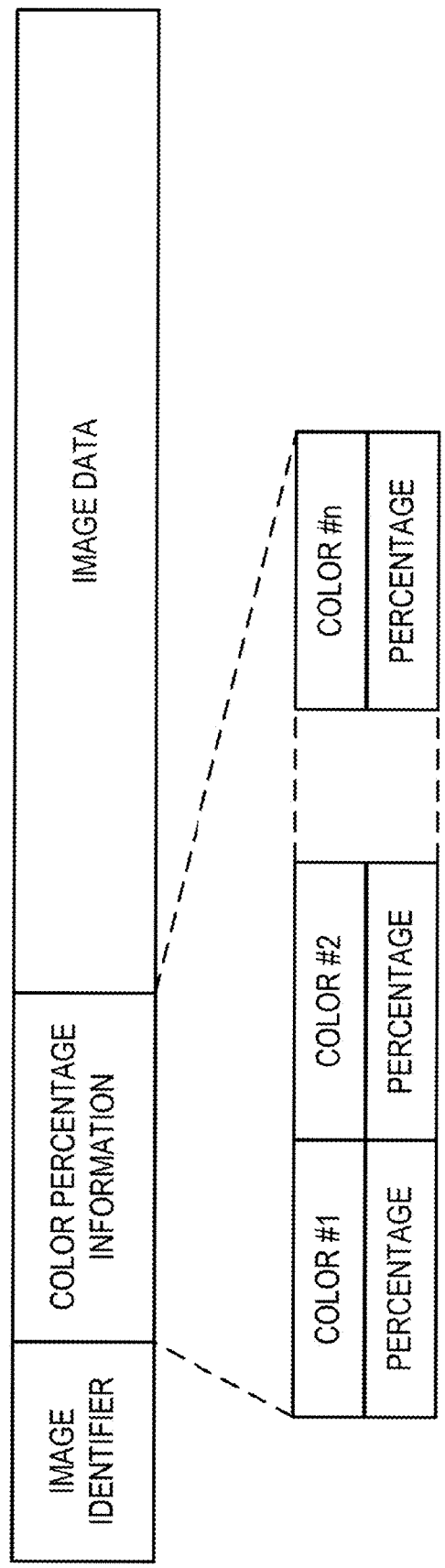
FIG. 7 is a diagram illustrating data to be created by a color percentage calculating unit.

FIG. 7 is a diagram illustrating data to be created by the color percentage calculating unit 366, wherein FIG. 7(A) illustrates color percentage information and FIG. 7(B) illustrates a histogram.

Color percentage information is created for each piece of image information and includes an image identifier, color percentage information, and image data.

Color percentage information includes information regarding color types (color #1, color #2, . . . , color #n), and numerical data regarding each percentage.

At the image providing module 38 (FIG. 6), the image component selecting unit 380 performs processing so as to display a screen to be used by the user to select an image component (for example, color information, time information, and positional information) on the output device 148 that is a liquid crystal screen or the like via the UI unit 302, and to enable selection of an image component using the input device 146 that is a numerical keypad or the like.

In addition, the image component selecting unit 380 outputs an image component selected by a user operation to the image provision processing unit 388.

The image designating unit 382 accepts image information designated by a user operation via the UI unit 302 and outputs the image information to the difference calculating unit 384.

The difference calculating unit 384 accepts color percentage information (FIG. 7(A)) regarding all image information from the color percentage calculating unit 366, and accepts metadata regarding all image information from the metadata acquiring unit 368.

In addition, the difference calculating unit 384 compares color percentage information regarding designated image information with color percentage information regarding other image information, and calculates a difference amount indicating a degree of similarity between the designated image information and the other image information.

Specifically, a comparison is performed on each color included in the color percentage information, and a difference amount (color difference amount) is calculated from the comparison result for each piece of image information.

In addition, the difference calculating unit 384 compares metadata (time information, positional information) regarding designated image information with metadata regarding other image information, and calculates a difference amount (time difference amount, positional difference amount) regarding metadata for each piece of image information.

Furthermore, the difference calculating unit 384 creates difference data illustrated in FIG. 8 for each piece of image information from the calculated difference amount and outputs the difference data to the image sequence creating unit 386.

FIG. 8 is a diagram illustrating difference data to be created by the difference calculating unit 384.

As illustrated in FIG. 8, difference data includes an image identifier, a color difference amount, a time difference amount, a positional difference amount, and image data.

In this case, with difference data regarding image information designated by the user, the color difference amount, the time difference amount, and the positional difference amount all take values of 0.

Based on the difference data, the image sequence creating unit 386 (FIG. 6) creates image sequence information so as to arrange image information in an ascending order of difference amount for each image component (color, time, and position), and outputs the image sequence information to the image provision processing unit 388.

Figure 9:
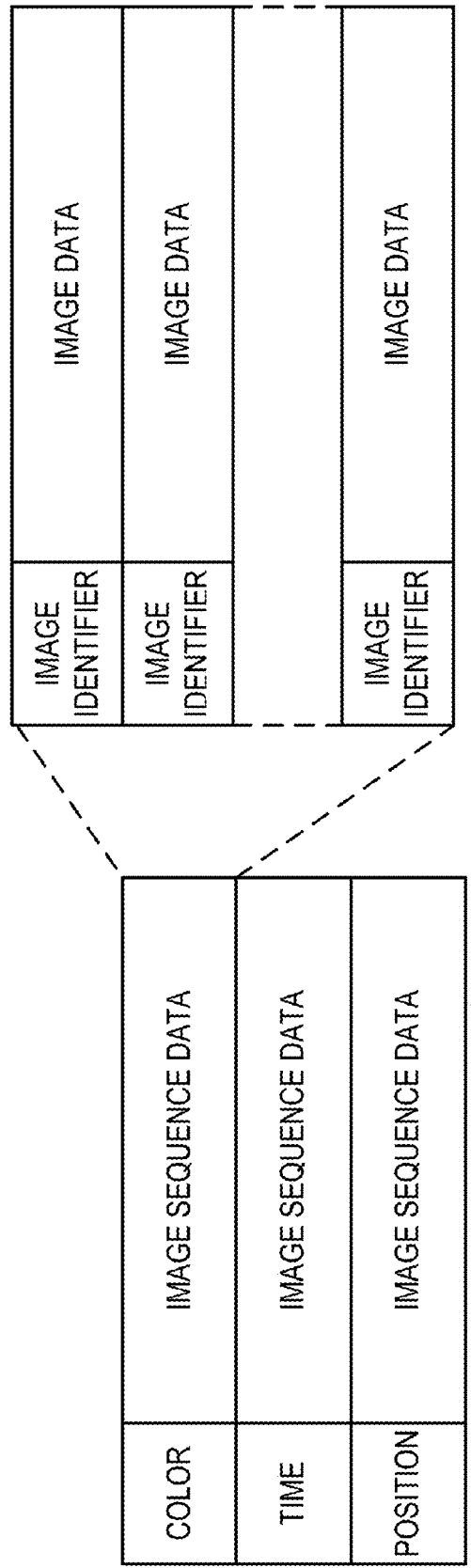
FIG. 9 is a diagram illustrating image sequence information.

FIG. 9 is a diagram illustrating image sequence information.

As illustrated in FIG. 9, image sequence information respectively includes image sequence data for color, time, and position. Image sequence data includes an image identifier and image data arranged as described above.

In this case, image information designated by the user comes at the top of image sequence data.

Based on image sequence data corresponding to the image component from the image component selecting unit 380, the image provision processing unit 388 (FIG. 6) performs processing necessary for providing image information to the output device 148 such as a liquid crystal display screen.

Due to the processing by the image provision processing unit 388, image information is arranged and displayed on the display screen in an order in which image information is determined to be similar to the image information designated by the user.

The image information to be displayed by this process may be image names of image information or thumbnails of image data.

The image selecting unit 392 accepts an identifier of image information selected by a user operation performed on the input device 146 via the UI unit 302, and outputs the image information identifier to the detailed image display processing unit 394.

The detailed image display processing unit 394 acquires image information corresponding to the image identifier from the image information managing unit 324, and performs processing necessary for displaying more detailed image data on the output device 148.

Hereinafter, overall processing of the terminal program 30 will be described.

Figure 10:
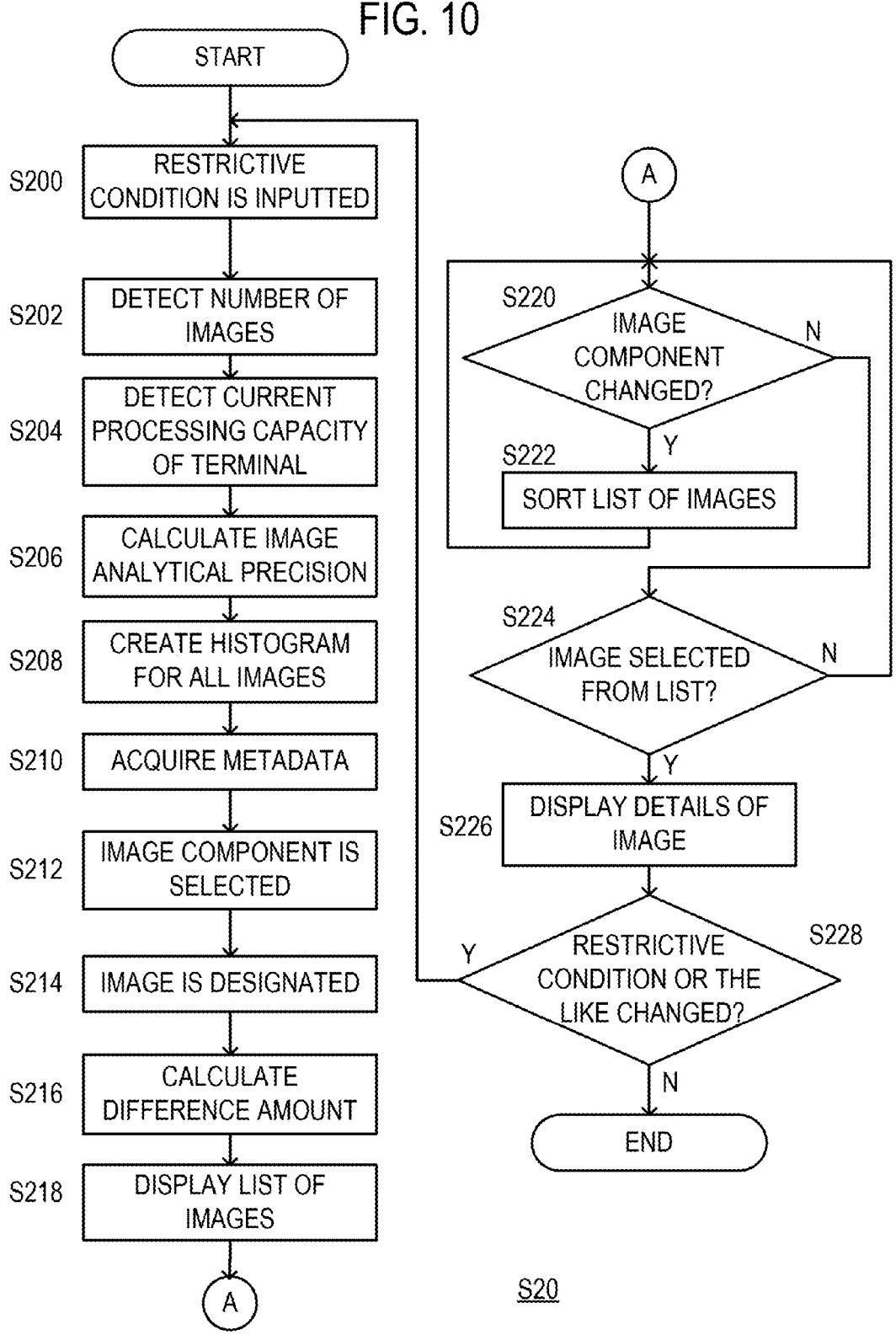
FIG. 10 is a flowchart illustrating processing of the terminal program illustrated in FIG. 6.

FIG. 10 is a flowchart (S20) illustrating processing of the terminal program 30 illustrated in FIG. 6.

As illustrated in FIG. 10, in step 200 (S200), the restrictive condition inputting unit 342 accepts restrictive condition information (time limit, power consumption, display screen size, or the like) inputted by a user operation.

In step 202 (S202), the image-count detecting unit 348 detects the number of pieces of image information stored in the image DB 326.

In step 204 (S204), by accessing the CPU 140, the memory 142, and the like, the processing capacity detecting unit 346 detects a current processing capacity of the terminal 3.

In step 206 (S206), the image analytical precision calculating unit 344 calculates an image analytical precision necessary for searching an image.

In step 208 (S208), the color percentage calculating unit 366 calculates a color percentage for each piece of image information and creates a histogram for each image.

In step 210 (S210), the metadata acquiring unit 368 acquires metadata (time information, positional information) from the image information acquiring unit 362.

In step 212 (S212), the image component selecting unit 380 accepts an image component (color information, time information, positional information) inputted by a user operation.

In step 214 (S214), the image designating unit 382 accepts image information designated by a user operation.

In step 216 (S216), the difference calculating unit 384 calculates, for each piece of image information, a difference amount indicating a difference between designated image information and other image information.

In step 218 (S218), due to the processing by the image provision processing unit 388, image information is arranged and displayed on the display screen in an order in which image information is determined to be similar to the designated image information.

At this point, if "color" is selected as the image component, image information is arranged in an ascending order of color difference amounts.

Moreover, when time limit is selected as restrictive condition information, the processing times of S214 to S218 are to be limited.

In step 220 (S220), the image component 380 determines whether a change to the image component (color information, time information, positional information) by a user operation has been accepted or not.

If a change has been accepted, processing proceeds to S222, and if not, processing proceeds to S224.

In step 222 (S222), due to the processing by the image provision processing unit 388, for changed image components, image information is arranged and displayed on the display screen in an order in which image information is determined to be similar to the image information designated by the user.

For example, when the image component has been changed from color to time, display is changed so that image information is arranged in an order of nearest to farthest from the time of photography of the designated image.

In step 224 (S224), a determination is made on whether or not image information has been selected by a user operation.

If image information has been selected, processing proceeds to S226. If not, processing returns to S220.

In step 226 (S226), the detailed image display processing unit 394 causes detailed image data of the selected image to be displayed on the output device 148.

In step 228 (S228), a determination is made on whether or not the restrictive condition, the number of images, and the current processing capacity of the terminal have been changed.

If it is determined that a change has been made, processing returns to S200. If not, processing is terminated.

It should be noted that the sequence of the respective processes or the like illustrated in FIG. 10 may be modified as deemed appropriate.

The flowcharts, sequences and the like described below may similarly be modified as deemed appropriate.

Moreover, an arrangement is also possible in which: the image component selecting unit 380 accepts a selection of an image component before an image analytical precision is calculated by the image analytical precision calculating unit 344; the image analytical precision calculating unit 344 calculates only an image analytical precision corresponding to the selected image component; and the image analyzing module 36 performs image analysis only according to the selected image component (the same logic also applies to other embodiments to be described below).

In addition, while the embodiment described above is arranged so as to limit the time required for the processing of the image providing module 38 when time limit is the restrictive condition, an arrangement is also possible in which the times required by the processing of the image analyzing module 36 as well as the processing of the image providing module 38 are limited (the same logic also applies to other embodiments to be described below).

In this case, an arrangement is also possible in which, before an image analytical precision is calculated by the image analytical precision calculating unit 344, the image component selecting unit 380 accepts a selection of an image component and the image designating unit 382 accepts a designation of an image (the same logic also applies to other embodiments to be described below).

Second Embodiment

Next, a second embodiment of the disclosure of the present application will be described.

[Image Providing Server Program 22]

Figure 11:
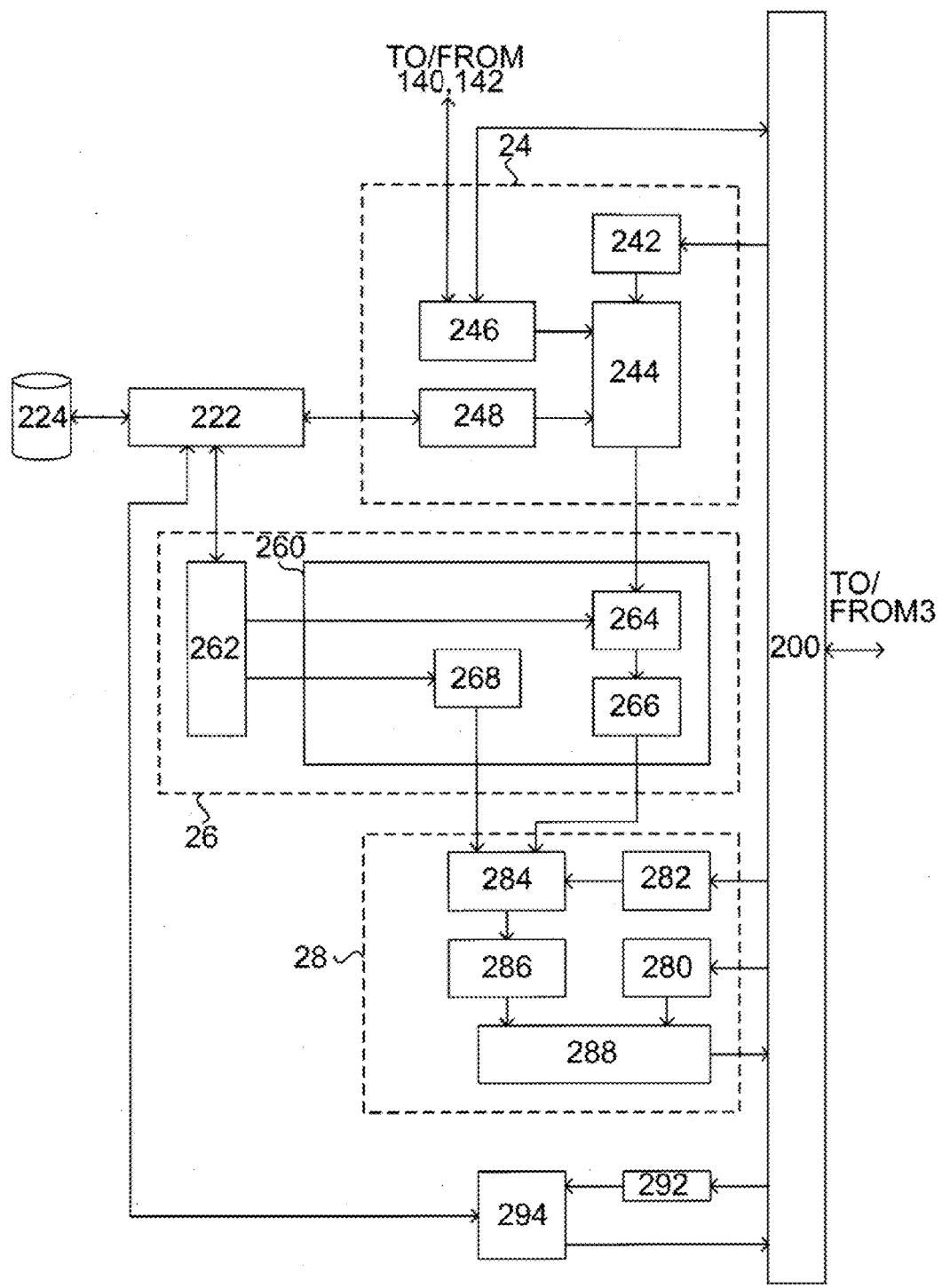
FIG. 11 is a diagram illustrating a second image providing server program to be executed at the image providing server illustrated in FIGS. 1 and 2.

FIG. 11 is a diagram illustrating a second image providing server program 22 to be executed at the image providing server 2 illustrated in FIGS. 1 and 2 in place of the image providing server program 20.

As illustrated in FIG. 11, the second image providing server program 22 is made up of a communication processing unit 200, an image information managing unit 222, an image database (DB) 224, an analytical precision calculating module 24, an image analyzing module 26, an image providing module 28, an image selection receiving unit 292, and a detailed image data transmitting unit 294.

Using these components, the image providing server program 22 calculates an analytical precision of an image so as to satisfy a designated restrictive condition, and analyzes one or more images at the calculated analytical precision.

In addition, when displaying a designated image among the one or more images together with images other than the designated image, the image providing server program 22 arranges the images in an order of analysis results of the images of nearest to farthest from the designated image.

In the image providing server program 22, the image information managing unit 222 stores image information acquired via the network 100, the recording medium 154 and the like into the image DB 224, manages image information stored in the image DB 224, and, in response to a request from another module, acquires image information from the image DB 224 and outputs the image information to the module having made the request.

The analytical precision calculating module 24 is made up of a restrictive condition receiving unit 242, an image analytical precision calculating unit 244, a processing capacity detecting unit 246, and an image-count detecting unit 248.

Using these components, the analytical precision calculating module 24 calculates an analytical precision of an image which satisfies a designated restrictive condition.

The image analyzing module 26 is made up of an image information acquiring unit 262 and an image component extracting unit 260.

Using these components, the image analyzing module 26 analyzes image information based on a calculated analytical precision.

The image providing module 28 is made up of an image component receiving unit 280, an image designation receiving unit 282, a difference calculating unit 284, an image sequence creating unit 286, and an image provision information transmitting unit 288.

Using these components, the image providing module 28 accepts an image designation, calculates differences between an analysis result of image information of the designated image and image information of images other than the designated image, and provides a list of images arranged in an ascending order of differences as a search result.

In the analytical precision calculating module 24, the restrictive condition receiving unit 242 receives restrictive condition information regarding a restrictive condition designated by a user from the terminal 3 via the network 100 and the communication processing unit 200, and outputs the restrictive condition information to the image analytical precision calculating unit 244.

In the same manner as the processing capacity detecting unit 346 of the terminal program 30, by accessing the CPU 140, the memory 142, and the like of the terminal 3, the processing capacity detecting unit 246 detects a current processing capacity of the terminal 3.

In addition, by accessing the CPU 140, the memory 142, and the like of the image providing server 2, the processing capacity detecting unit 246 detects a current processing capacity of the image providing server 2.

Furthermore, the processing capacity detecting unit 246 checks the communication state between the image providing server 2 and the terminal 3 and detects a current communication capacity (data transmission speed or the like) of the network 100 or the like.

Moreover, the processing capacity detecting unit 246 outputs information (processing capacity information) regarding the detected processing capacities to the image analytical precision calculating unit 244.

In the same manner as the image-count detecting unit 348 of the terminal program 30, the image-count detecting unit 248 outputs a signal for detecting the number of pieces of image information stored in the image DB 224 to the image information managing unit 222.

In response to the signal from the image-count detecting unit 248, the image information managing unit 222 detects the number of pieces of image information stored in the image DB 224, and outputs image-count information to the image-count detecting unit 248.

The image-count detecting unit 248 outputs the image-count information from the image information managing unit 222 to the image analytical precision calculating unit 244.

In the same manner as the image analytical precision calculating unit 344 of the terminal program 30, the image analytical precision calculating unit 244 uses the accepted restrictive condition information, processing capacity information, and image-count information to calculate an image analytical precision necessary for searching an image.

In addition, the image analytical precision calculating unit 244 outputs the calculated image analytical precision to the image analyzing module 26.

In the same manner as the image information acquiring unit 362 of the terminal program 30, the image information acquiring unit 262 in the image analyzing module 26 acquires image information from the image information managing unit 222.

In the same manner as the image component extracting unit 360 of the terminal program 30, the image component extracting unit 260 extracts an image component from the image information acquiring unit 262 and performs an image analysis according to the image component.

In the same manner as the image component extracting unit 360 of the terminal program 30, the image component extracting unit 260 is made up of, for example, a color classifying unit 264, a color percentage calculating unit 266, and a metadata acquiring unit 268.

In the same manner as the metadata acquiring unit 368 of the terminal program 30, the metadata acquiring unit 268 acquires metadata (time information, positional information) from the image information acquiring unit 262 and outputs the metadata to the image providing module 28.

In the same manner as the color classifying unit 364 of the terminal program 30, the color classifying unit 264 acquires image information from the image information acquiring unit 262 and classifies, for each piece of image information, used colors according to a chromatic resolution n calculated by the image analytical precision calculating unit 244.

In the same manner as the color percentage calculating unit 366 of the terminal program 30, the color percentage calculating unit 266 calculates a color percentage for each piece of image information and creates an n-color histogram for each image.

In addition, the color percentage calculating unit 266 outputs calculated color percentage information to the image providing module 28.

In the image providing module 28, the image component receiving unit 280 receives an image component selected by the user from the terminal 3 via the network 100 and the communication processing unit 200, and outputs the image component to the image provision information transmitting unit 288.

The image designation receiving unit 282 receives image information designated by the user from the terminal 3 via the network 100 and the communication processing unit 200, and outputs the image information to the difference calculating unit 284.

In the same manner as the difference calculating unit 384 of the terminal program 30, the difference calculating unit 284 accepts color percentage information (FIG. 7(A)) regarding all image information from the color percentage calculating unit 266, and accepts metadata regarding all image information from the metadata acquiring unit 268.

In addition, in the same manner as the difference calculating unit 384 of the terminal program 30, the difference calculating unit 284 compares color percentage information regarding designated image information with color percentage information regarding other image information, and calculates a difference amount indicating a degree of similarity between the designated image information and the other image information.

Furthermore, in the same manner as the difference calculating unit 384 of the terminal program 30, the difference calculating unit 284 compares metadata (time information, positional information) regarding designated image information with metadata regarding other image information, and calculates a difference amount (time difference amount, positional difference amount) regarding metadata for each piece of image information.

Moreover, the difference calculating unit 284 creates difference data illustrated in FIG. 8 for each piece of image information from the calculated difference amount and outputs the difference data to the image sequence creating unit 286.

In the same manner as the image sequence creating unit 386 of the terminal program 30, based on the difference data, the image sequence creating unit 286 creates image sequence information such that image information is arranged in an ascending order of difference amount for each image component (color, time, and position), and outputs the image sequence information to the image provision information transmitting unit 288.

In the same manner as the image provision processing unit 388 of the terminal program 30, based on image sequence data corresponding to the image component from the image component selecting unit 280, the image provision information transmitting unit 288 performs processing necessary for providing image information to the output device 148 such as a liquid crystal display screen of the terminal 3.

In addition, the image provision information transmitting unit 288 transmits image provision information generated by the processing described above to the terminal 3 via the communication processing unit 200 and the network 100.

The image selection receiving unit 292 receives an identifier of the image information selected by the user from the terminal 3 via the network 100 and the communication processing unit 200, and outputs the identifier to the detailed image data transmitting unit 294.

The detailed image data transmitting unit 294 acquires image information corresponding to the image identifier from the image information managing unit 222, and transmits more detailed image data to the terminal 3 via the communication processing unit 200 and the network 100.

[Terminal Program 40]

Figure 12:
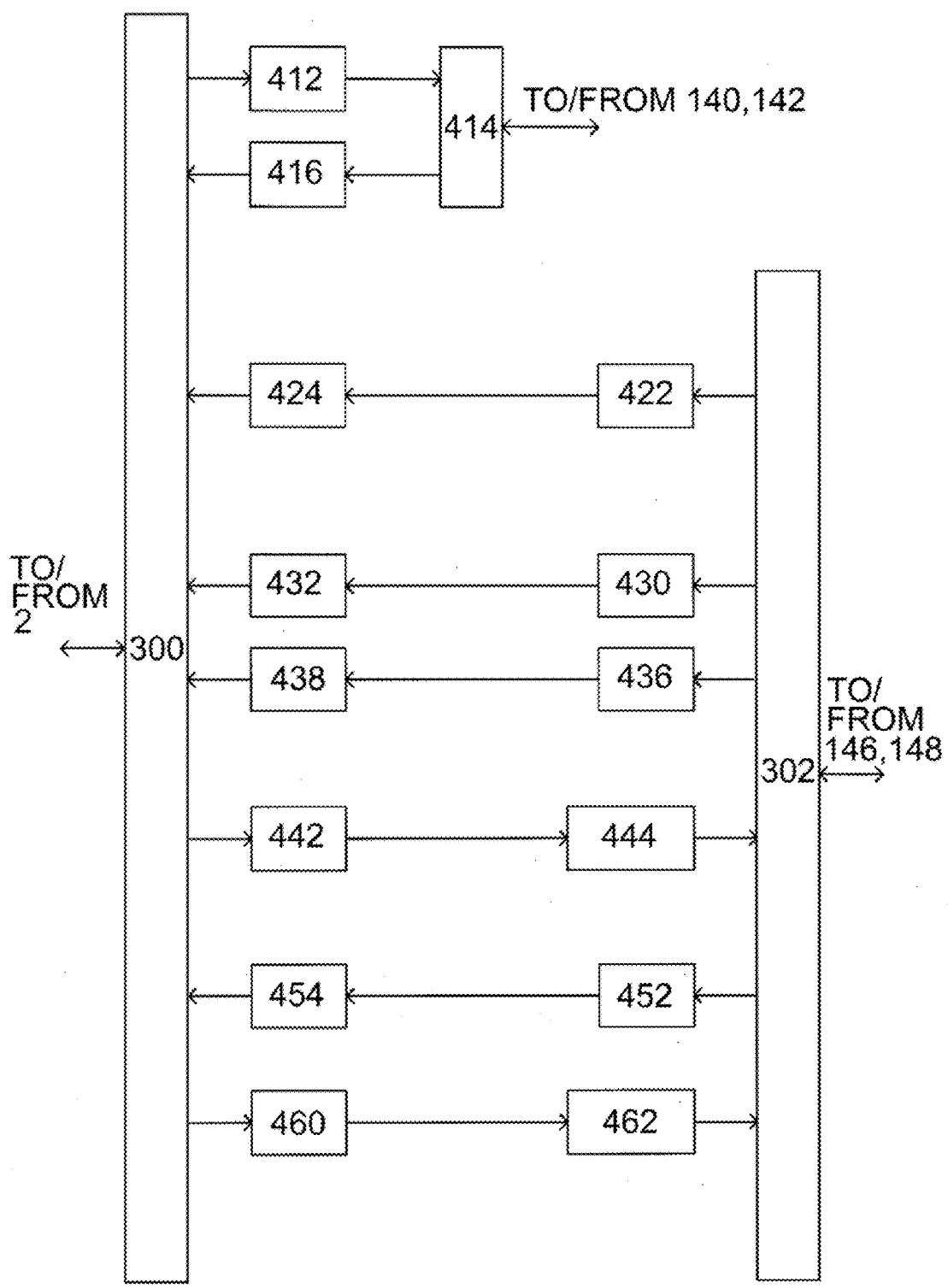
FIG. 12 is a diagram illustrating a second terminal program to be executed at the terminal illustrated in FIGS. 1 and 3.

FIG. 12 is a diagram illustrating a second terminal program 40 to be executed at the terminal 3 illustrated in FIGS. 1 and 3 in place of the terminal program 30.

As illustrated in FIG. 12, the second terminal program 40 is made up of a communication processing unit 300, a UI 302, a processing capacity detection receiving unit 412, a processing capacity detecting unit 414, a processing capacity information transmitting unit 416, a restrictive condition inputting unit 422, a restrictive condition transmitting unit 424, an image component inputting unit 430, an image component transmitting unit 432, an image designation inputting unit 436, an image designation transmitting unit 438, an image provision information receiving unit 442, an image display processing unit 444, an image selection inputting unit 452, an image selection transmitting unit 454, a detailed image data receiving unit 460, and a detailed image display processing unit 462.

In the terminal program 40, the processing capacity detection receiving unit 412 receives a signal for detecting the processing capacities of the CPU 140 and the memory 142 of the terminal 3 from the image providing server 2 via the network 100 and the communication processing unit 300, and outputs the signal to the processing capacity detecting unit 414.

By accessing the CPU 140, the memory 142, and the like, the processing capacity detecting unit 414 detects a current processing capacity of the terminal 3.

In addition, the processing capacity detecting unit 414 outputs information (processing capacity information) regarding the detected processing capacity to the processing capacity information 416.

The processing capacity information transmitting unit 416 outputs the processing capacity information from the processing capacity detecting unit 414 to the image providing server 2 via the network 100 and the communication processing unit 300.

In the same manner as the restrictive condition inputting unit 342 of the terminal program 30, the restrictive condition inputting unit 422 performs processing so as to display a screen to be used by the user to input a restrictive condition on the output device 148 that is a liquid crystal screen or the like via the UI unit 302, and to enable input of a restrictive condition using the input device 146 that is a numerical keypad or the like.

In addition, the restrictive condition inputting unit 422 outputs restrictive condition information inputted by a user operation to the restrictive condition transmitting unit 424.

The restrictive condition transmitting unit 424 transmits the restrictive condition information from the restrictive condition inputting unit 422 to the image providing server 2 via the network 100 and the communication processing unit 300.

The image component inputting unit 430 performs processing so as to display a screen to be used by the user to select an image component (for example, color information, time information, and positional information) on the output device 148 that is a liquid crystal screen or the like via the UI unit 302, and to enable selection of an image component using the input device 146 that is a numerical keypad or the like.

In addition, the image component inputting unit 430 outputs an image component selected by a user operation to the image component transmitting unit 432.

The image component transmitting unit 432 transmits the image component information selected by the user to the image providing server 2 via the network 100 and the communication processing unit 300.

The image designation inputting unit 436 accepts image information designated by a user operation via the UI unit 302 and outputs the image information to the image designation transmitting unit 438.

The image designation transmitting unit 438 transmits the image information designated by the user to the image providing server 2 via the network 100 and the communication processing unit 300.

The image provision information receiving unit 442 receives image provision information from the image providing server 2 via the network 100 and the communication processing unit 300, and outputs the image provision information to the image display processing unit 444.

Based on the image provision information from the image display processing unit 444, the image display processing unit 444 performs processing necessary for displaying image information on the output device 148 that is a liquid crystal display screen or the like.

The image information to be displayed may be image names of image information or thumbnails of image data.

The image selection inputting unit 452 accepts an identifier of image information selected by a user operation performed on the input device 146 via the UI unit 302, and outputs the image information identifier to the image selection transmitting unit 454.

The image selection transmitting unit 454 transmits the identifier of the image information selected by the user to the image providing server 2 via the network 100 and the communication processing unit 300.

The detailed image data receiving unit 460 receives more detailed image data from the image providing server 2 via the network 100 and the communication processing unit 300, and outputs the more detailed image data to the detailed image display processing unit 462.

The detailed image display processing unit 462 performs processing necessary for displaying more detailed image data on the output device 148.

[Overall Operations of Image Display System 1]

Hereinafter, overall operations of the image display system 1 according to the second embodiment will be described.

Figure 13:
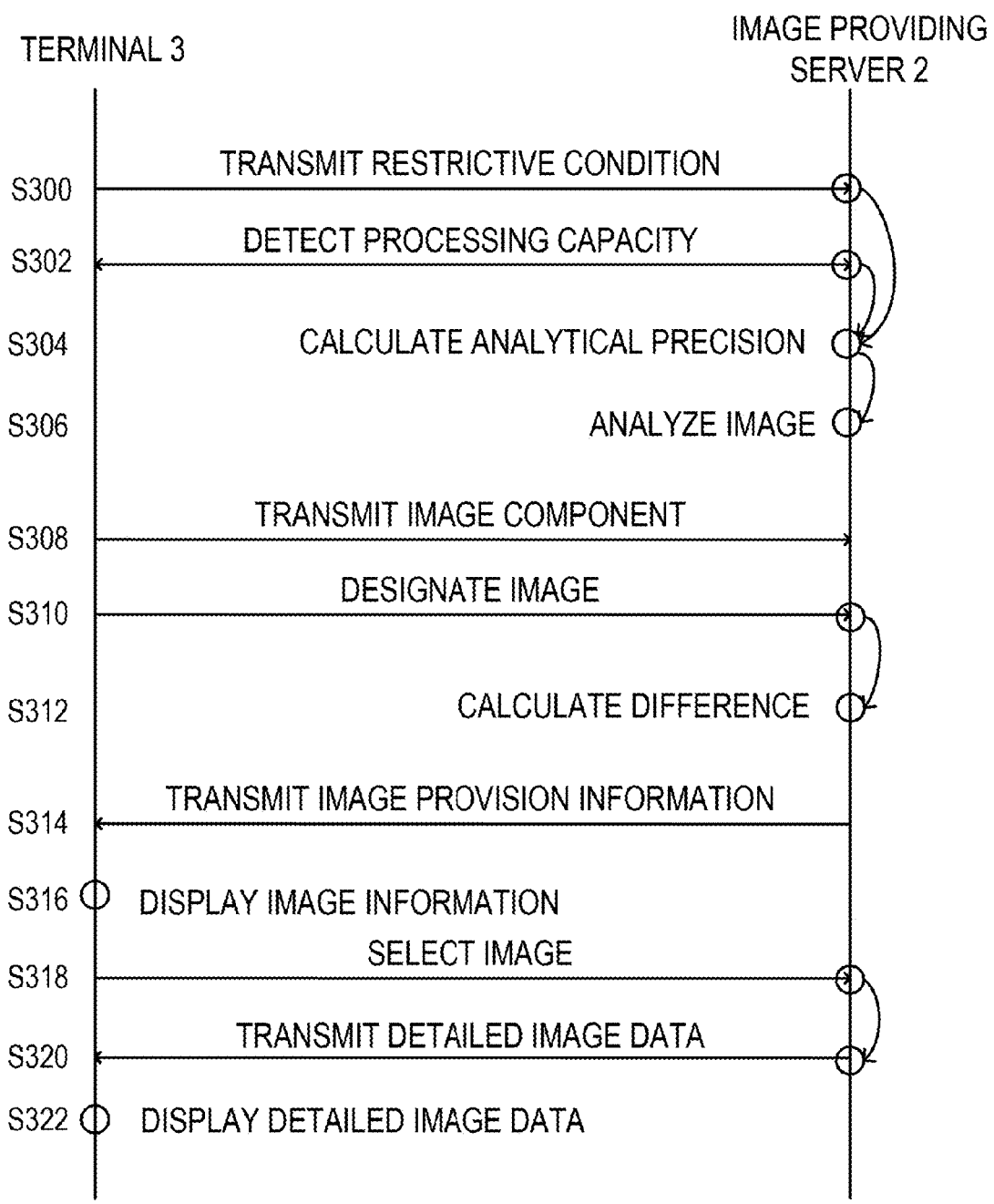
FIG. 13 is a communication sequence diagram illustrating overall operations of an image display system according to a second embodiment.

FIG. 13 is a communication sequence diagram illustrating overall operations (S30) of the image display system 1 according to the second embodiment illustrated in FIG. 1.

As illustrated in FIG. 13, in step 300 (S300), the terminal 3 transmits restrictive condition information to the image providing server 2.

In step 302 (S302), the image providing server 2 detects current processing capacities of the terminal 3 and the image providing server 2 and a current communication capacity of a communication channel such as the network 100.

In step 304 (S304), the image providing server 2 calculates an image analytical precision based on the restrictive condition information and current processing capacities.

In step 306 (S306), the image providing server 2 performs an image analysis for searching an image on each piece of image information.

In step 308 (S308), the terminal 3 transmits an image component (color information, time information, positional information) inputted by a user operation to the image providing server 2.

In step 310 (S310), the terminal 3 transmits image information designated by a user operation to the image providing server 2.

In step 312 (S312), the image providing server 2 calculates, for each piece of image information, a difference amount indicating a difference between designated image information and other image information.

In step 314 (S314), the image providing server 2 transmits image provision information to the terminal 3.

In step 316 (S316), the terminal 3 displays image information on the output device 148 based on the image provision information.

Moreover, when time limit is selected as restrictive condition information, the processing times of S310 to S316 are to be limited.

In step 318 (S318), the terminal 3 transmits an identifier of image information selected by the user to the image providing server 2.

In step 320 (S320), the image providing server 2 transmits detailed image data corresponding to the image identifier from the terminal 3 to the terminal 3.

In step 322 (S322), the terminal 3 displays detailed image data on the output device 148.

While the first embodiment and the second embodiment described above have been arranged such that an analytical precision calculating module, an image analyzing module, and an image providing module exist in any one of the image providing server 2 and the terminal 3, an arrangement is also possible in which the modules respectively exist in separate nodes (the same logic also applies to the respective embodiments to be described below).

For example, an arrangement is also possible in which an analytical precision calculating module and an image analyzing module exist in the image providing server 2 and an image providing module exists in the terminal 3.

Third Embodiment

Next, a third embodiment of the disclosure of the present application will be described.

A program that is substantially the same as the image providing server program 20 described earlier is to be executed at an image providing server 2 according to the third embodiment.

[Terminal Program 50]

Figure 14:
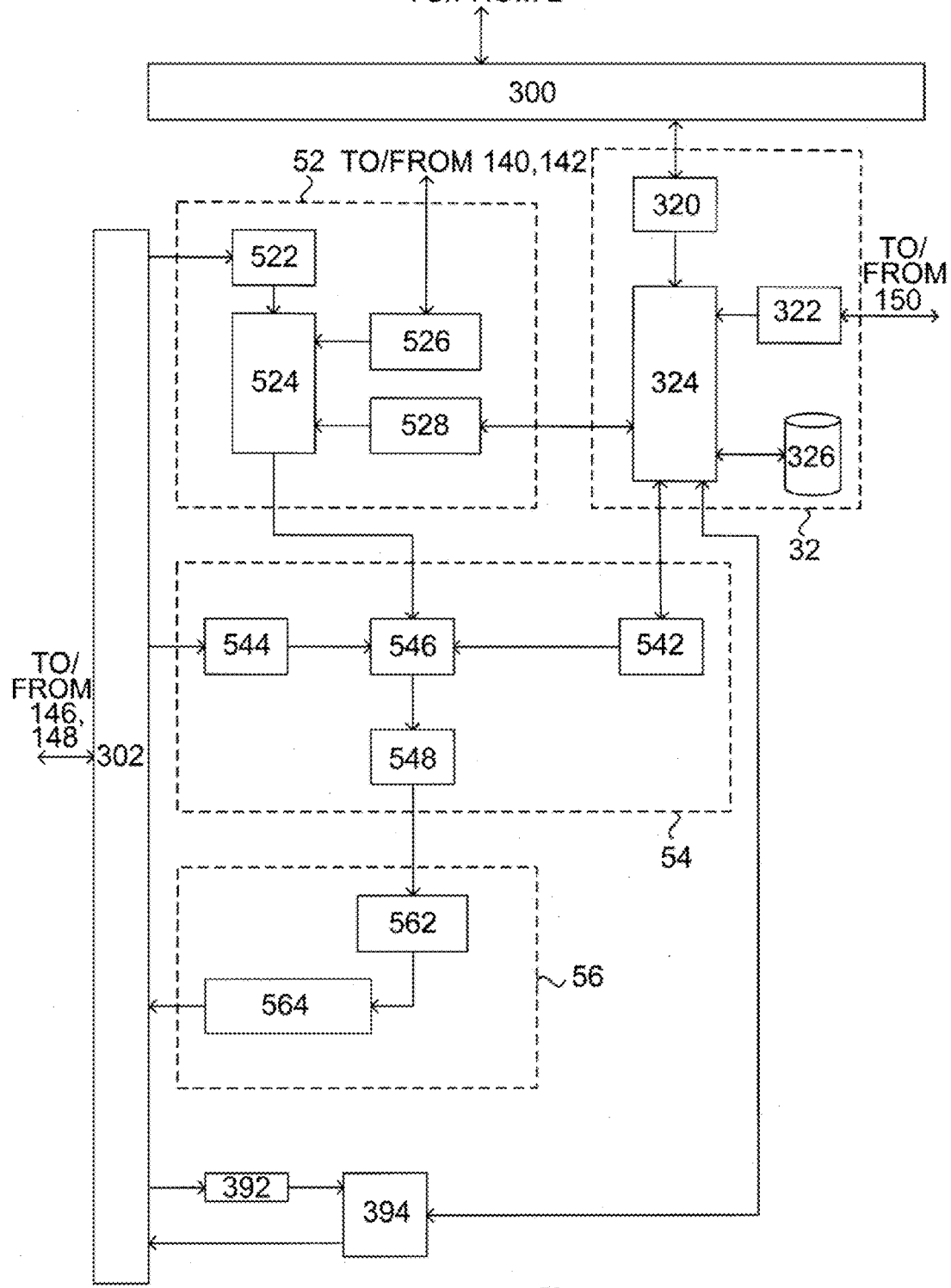
FIG. 14 is a diagram illustrating a third terminal program to be executed at the terminal illustrated in FIGS. 1 and 3.

FIG. 14 is a diagram illustrating a third terminal program 50 to be executed at the terminal 3 illustrated in FIGS. 1 and 3.

As illustrated in FIG. 14, the third terminal program 50 includes a communication processing unit 300, a UI 302, an image storing module 32, an detection precision calculating module 52, a detecting module 54, an image providing module 56, an image selecting unit 392, and a detailed image display processing unit 394.

Using these components, the terminal program 50 calculates a detection precision for detecting a detection target from each piece of image information so as to satisfy a designated restrictive condition, performs image processing on each piece of image information based on the calculated detection precision, and detects a projection (detection target) of a designated object from an image corresponding to each piece of image information.

In addition, the terminal program 50 arranges the respective pieces of image information depending on the number of detected objects.

In this case, a "projection" refers to a picture of an object projected in an image.

For example, in the case of an image corresponding to a photograph in which a person and a building are taken together, a "projection" of the person and a "projection" of the building are projected onto the "image".

In other words, a "projection" is to be included in an "image". An "image" (for example, a photograph) is made up of one or more "projections" (for example, a projection of a person and a projection of a building).

The detection precision calculating module 52 is made up of a restrictive condition inputting unit 522, a detection precision calculating unit 524, a processing capacity detecting unit 526, and an image-count detecting unit 528.

Using these components, the detection precision calculating module 52 calculates a detection precision that satisfies a designated restrictive condition.

The detecting module 54 is made up of an image information acquiring unit 542, an object name inputting unit 544, an object detecting unit 546, and an object-count calculating unit 548.

Using these components, the detecting module 54 detects a projection of a designated object from each image based on the calculated detection precision, and calculates the number of projections of the designated object included in each image.

The image providing module 56 is made up of an image sequence creating unit 562 and an image provision processing unit 564.

Using these components, the image providing module 56 arranges the respective pieces of image information according to the number of detected objects and provides a list of arranged images as a search result.

In the same manner as the restrictive condition inputting unit 342 of the terminal program 30, the restrictive condition inputting unit 522 in the detection precision calculating module 52 performs processing so as to display a screen to be used by a user to input the restrictive condition described earlier on the output device 148 that is a liquid crystal screen or the like via the UI unit 302, and to enable input of a restrictive condition using the input device 146 that is a numerical keypad or the like.

In addition, the restrictive condition inputting unit 522 outputs restrictive condition information inputted by a user operation to the detection precision calculating unit 524.

In the same manner as the processing capacity detecting unit 346 of the terminal program 30, by accessing the CPU 140, the memory 142, and the like, the processing capacity detecting unit 526 detects a current processing capacity of the terminal 3.

In addition, the processing capacity detecting unit 526 outputs processing capacity information to the detection precision calculating unit 524.

In the same manner as the image-count detecting unit 348 of the terminal program 30, the image-count detecting unit 528 acquires the number of pieces of image information stored in the image DB 326, and outputs the number of pieces of image information to the detection precision calculating unit 524.

The detection precision calculating unit 524 uses the accepted restrictive condition information, processing capacity information, and image-count information to calculate a detection precision necessary for detecting an object.

In addition, the detection precision calculating unit 524 outputs the calculated detection precision to the detecting module 54.

In this case, a detection precision refers to a degree of accuracy when detecting a projection of a designated object from an image. While a higher detection precision results in a higher degree of accuracy at which a projection of a designated object is detected, throughput also increases and the time necessary for processing increases as well.

Furthermore, a detection precision includes a precision of image processing required when detecting a projection of a designated object from an image.

In the same manner as the image information acquiring unit 362 of the terminal program 30, the image information acquiring unit 542 in the detecting module 54 acquires image information from the image information managing unit 324.

The object name inputting unit 544 performs processing so as to display a screen to be used by the user to designate an object name (for example, "person", "vehicle", "tree", "building", or the like) by input or selection on the output device 148 that is a liquid crystal screen or the like via the UI unit 302, and to enable designation of an object name using the input device 146 that is a numerical keypad or the like.

In addition, the object name inputting unit 544 outputs an object name designated by a user operation to the object detecting unit 546.

Based on the detection precision from the detection precision calculating module 52, the object detecting unit 546 performs image processing necessary for detecting, from an image, a projection of an object corresponding to the designated object name on each piece of image information acquired by the image information acquiring unit 542.

In addition, based on the detection precision from the detection precision calculating module 52, the object detecting unit 546 detects a projection of the designated object from each image subjected to image processing.

The object detecting unit 546 may be arranged so as to store several object patterns and to detect a projection of an object by collating the object patterns with each image.

Furthermore, when detecting a projection of a person, a determination of detection of a projection of a person may be made when a face is detected.

Based on a detection result of the object detecting unit 546, for each piece of image information, the object-count calculating unit 548 calculates the number of projections of a designated object included in an image of the image information, and outputs the numbers of objects corresponding to each piece of image information to the image providing module 56.

In the image providing module 56, the image sequence creating unit 562 creates image sequence information so that the respective pieces of image information are arranged in a descending order of the numbers of objects, and outputs the image sequence information to the image provision processing unit 564.

Based on the image sequence information, the image provision processing unit 564 performs processing necessary for displaying image information on the output device 148 that is a liquid crystal display screen or the like.

Due to the processing by the image provision processing unit 564, image information is arranged and displayed on the display screen in order of descending prevalence of an object designated by the user in the images of the image information.

Hereinafter, overall processing of the third terminal program 50 will be described.

Figure 15:
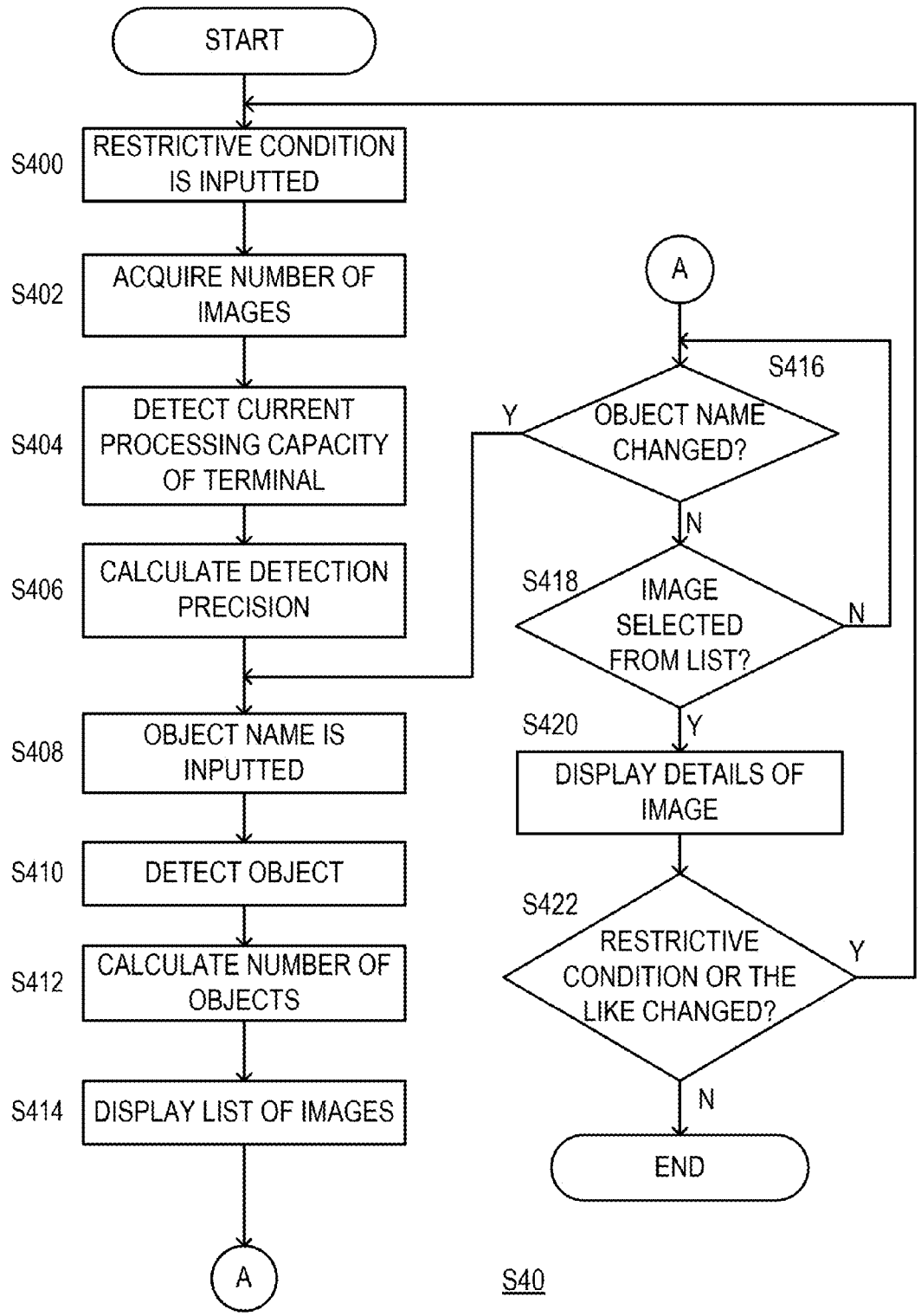
FIG. 15 is a flowchart illustrating processing of the third terminal program illustrated in FIG. 14.

FIG. 15 is a flowchart (S40) illustrating processing of the third terminal program 50 illustrated in FIG. 14.

As illustrated in FIG. 15, in step 400 (S400), the restrictive condition inputting unit 522 accepts restrictive condition information (time limit, power consumption, display screen size, or the like) inputted by a user operation.

In step 402 (S402), the image-count detecting unit 528 detects the number of pieces of image information stored in the image DB 326.

In step 404 (S404), by accessing the CPU 140, the memory 142, and the like, the processing capacity detecting unit 526 detects a current processing capacity of the terminal 3.

In step 406 (S406), the detection precision calculating unit 524 calculates a detection precision necessary for detecting an object from an image.

In step 408 (S408), the object name inputting unit 544 accepts an object name inputted by a user operation.

In step 410 (S410), the object detecting unit 546 detects a projection of an object corresponding to a designated object name.

In step 412 (S412), the object-count calculating unit 548 calculates, for each piece of image information, the number of projections of the designated object included in an image of the image information.

In step 414 (S414), due to the processing by the image provision processing unit 564, image information is arranged and displayed on the display screen in order of descending prevalence of the object designated by the user in the images of the image information.

For example, when "person" is selected as an object name, image information is arranged in descending order of the number of persons projected in the images.

Moreover, when time limit is selected as restrictive condition information, the processing times of S408 to S414 are to be limited.

In step 416 (S416), the object name inputting unit 544 determines whether a change to the object name by a user operation has been accepted or not.

If a change has been accepted, processing returns to S408, and if not, processing proceeds to S418.

In step 418 (S418), a determination is made on whether or not image information has been selected by a user operation.

If image information has been selected, processing proceeds to S422. If not, processing returns to S416.

In step 420 (S420), the detailed image display processing unit 394 causes detailed image data of the selected image to be displayed on the output device 148.

In step 422 (S422), a determination is made on whether or not the restrictive condition, the number of images, and the current processing capacity of the terminal have been changed.

If it is determined that a change has been made, processing returns to S400. If not, processing is terminated.

Moreover, an arrangement is also possible in which the object detecting unit 524 sets a plurality of objects in advance as objects that are detection targets, and after a detection precision is calculated by the detection precision calculating unit 524, projections of each object is detected from each image for all set objects before the object name inputting unit 544 accepts an object name (the same logic also applies to other embodiments to be described below).

In this case, the object-count calculating unit 548 may calculate, for each piece of image information, the number of projections of each of the set plurality of objects included in each image, and when an object name is inputted, the image sequence creating unit 562 may create image sequence information according to the inputted object (the same logic also applies to other embodiments to be described below).

Fourth Embodiment

Next, a fourth embodiment of the disclosure of the present application will be described.

[Image Providing Server Program 60]

Figure 16:
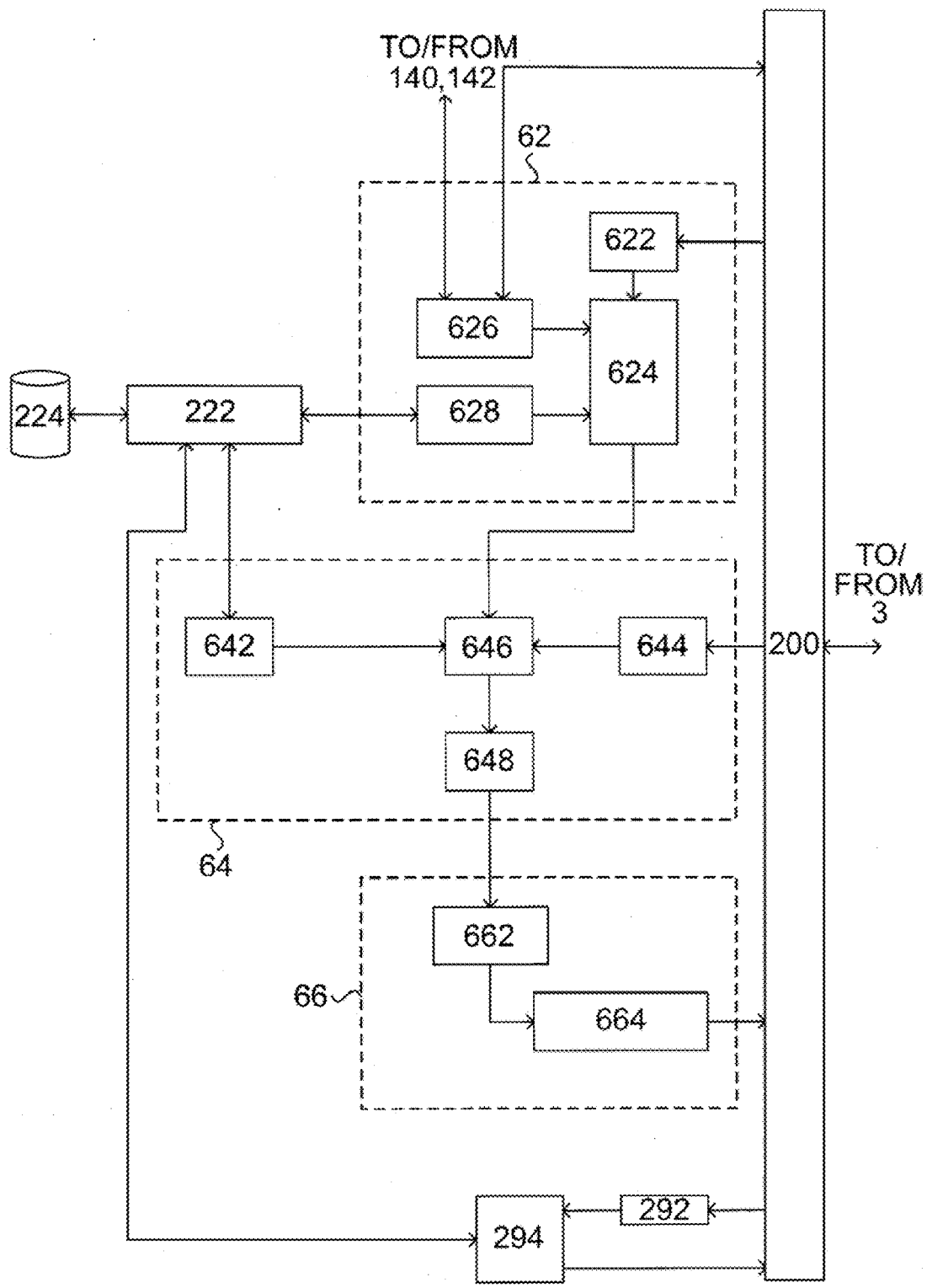
FIG. 16 is a diagram illustrating a fourth image providing server program to be executed at the image providing server illustrated in FIGS. 1 and 2.

FIG. 16 is a diagram illustrating a fourth image providing server program 60 to be executed at the image providing server 2 illustrated in FIGS. 1 and 2 in place of the image providing server program 20.

As illustrated in FIG. 16, the fourth image providing server program 60 is made up of a communication processing unit 200, an image information managing unit 222, an image database (DB) 224, a detection precision calculating module 62, a detecting module 64, an image providing module 66, an image selection receiving unit 292, and a detailed image data transmitting unit 294.

Using these components, the image providing server program 60 calculates a detection precision so as to satisfy a designated restrictive condition, performs image processing on each piece of image information based on the calculated detection precision, and detects a projection (detection target) of a designated object.

In addition, the image providing server program 60 arranges the respective pieces of image information according to the number of detected objects.

The detection precision calculating module 62 is made up of a restrictive condition inputting unit 622, a detection precision calculating unit 624, a processing capacity detecting unit 626, and an image-count detecting unit 628.

Using these components, the detection precision calculating module 62 calculates a detection precision that satisfies a designated restrictive condition.

The detecting module 64 is made up of an image information acquiring unit 642, an object name receiving unit 644, an object detecting unit 646, and an object-count calculating unit 648.

Using these components, the detecting module 64 detects a projection of a designated object from each image based on the calculated detection precision, and calculates the number of projections of the designated object included in each image.

The image providing module 66 is made up of an image sequence creating unit 662 and an image provision information transmitting unit 664.

Using these components, the image providing module 66 arranges the respective pieces of image information according to the number of detected objects and provides the terminal 3 with a list of arranged images as a search result.

In the detection precision calculating module 62, the restrictive condition inputting unit 622 receives restrictive condition information regarding a restrictive condition designated by a user from the terminal 3 via the network 100 and the communication processing unit 200, and outputs the restrictive condition information to the detection precision calculating unit 624.

By accessing the CPU 140, the memory 142, and the like of the terminal 3, the processing capacity detecting unit 626 detects a current processing capacity of the terminal 3.

In addition, by accessing the CPU 140, the memory 142, and the like of the image providing server 2, the processing capacity detecting unit 626 detects a current processing capacity of the image providing server 2.

Furthermore, the processing capacity detecting unit 626 checks the communication state between the image providing server 2 and the terminal 3 and detects a current communication capacity (data transmission speed or the like) of the network 100 or the like.

Moreover, the processing capacity detecting unit 626 outputs information (processing capacity information) regarding the detected processing capacities to the detection precision calculating unit 624.

The image-count detecting unit 628 outputs a signal for detecting the number of pieces of image information stored in the image DB 224 to the image information managing unit 222.

The detection precision calculating unit 624 uses the accepted restrictive condition information, processing capacity information, and image-count information to calculate a detection precision necessary for detecting an object.

In addition, the detection precision calculating unit 624 outputs the calculated detection precision to the detecting module 64.

In the detecting module 64, the image information acquiring unit 642 acquires image information from the image information managing unit 222.

The object name receiving unit 644 receives an object name designated by the user from the terminal 3 via the network 100 and the communication processing unit 200, and outputs the object name to the object detecting unit 646.

In the same manner as the object detecting unit 546 of the terminal program 50, based on the detection precision from the detection precision calculating module 62, the object detecting unit 646 performs image processing necessary for detecting, from an image, a projection of an object corresponding to the designated object name on each piece of image information acquired by the image information acquiring unit 642.

In addition, based on the detection precision from the detection precision calculating module 62, the object detecting unit 646 detects a projection of the designated object from each image subjected to image processing.

In the same manner as the object-count calculating unit 548 of the terminal program 50, based on a detection result of the object detecting unit 646, for each piece of image information, the object-count calculating unit 648 calculates the number of projections of a designated object included in an image of the image information, and outputs the number of objects corresponding to each piece of image information to the image providing module 66.

In the same manner as the image sequence creating unit 562 of the terminal program 50, the image sequence creating unit 662 in the image providing module 66 creates image sequence information so that the respective pieces of image information are arranged in a descending order of the numbers of objects, and outputs the image sequence information to the image provision processing unit 564.

Based on the image sequence information from the image sequence creating unit 662, the image provision information transmitting unit 664 performs processing necessary for providing image information to the output device 148 that is a liquid crystal display screen or the like of the terminal 3.

In addition, the image provision information transmitting unit 664 transmits image provision information generated by the processing described above to the terminal 3 via the communication processing unit 200 and the network 100.

[Terminal Program 68]

Figure 17:
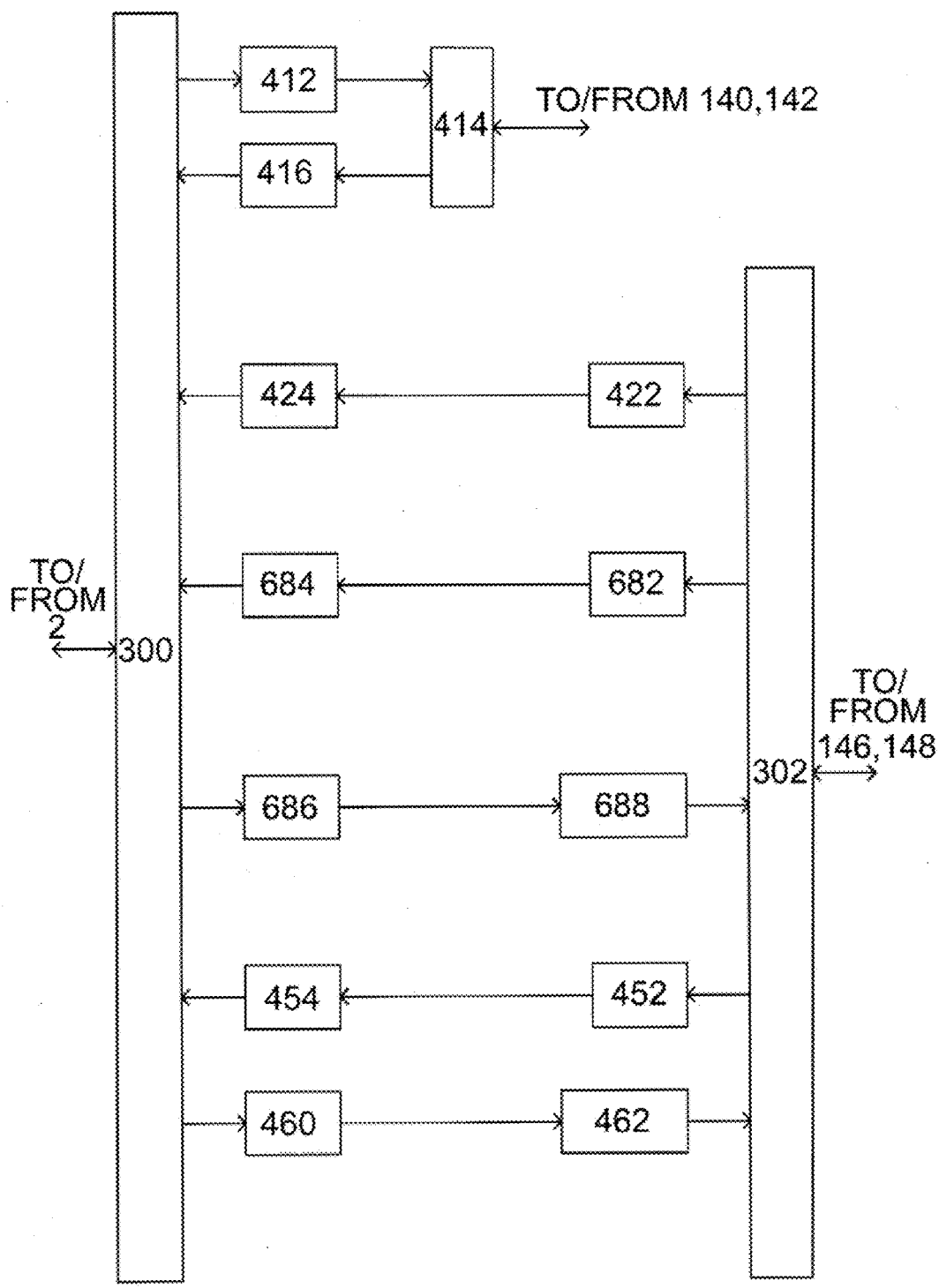
FIG. 17 is a diagram illustrating a fourth terminal program to be executed at the terminal illustrated in FIGS. 1 and 3.

FIG. 17 is a diagram illustrating a fourth terminal program 68 to be executed at the terminal 3 illustrated in FIGS. 1 and 3 in place of the terminal program 50.

As illustrated in FIG. 17, the fourth terminal program 68 is made up of a communication processing unit 300, a UI 302, a processing capacity detection receiving unit 412, a processing capacity detecting unit 414, a processing capacity information transmitting unit 416, a restrictive condition inputting unit 422, a restrictive condition transmitting unit 424, an object name inputting unit 682, an object name transmitting unit 684, an image provision information receiving unit 686, an image display processing unit 688, an image selection inputting unit 452, an image selection transmitting unit 454, a detailed image data receiving unit 460, and a detailed image display processing unit 462.

In the terminal program 68, the object name inputting unit 682 performs processing so as to display a screen to be used by the user to input an object name on the output device 148 that is a liquid crystal screen or the like via the UI unit 302, and to enable designation of an object name using the input device 146 that is a numerical keypad or the like.

In addition, the object name inputting unit 682 outputs an object name selected by a user operation to the object name transmitting unit 684.

The object name transmitting unit 684 transmits the object name selected by the user to the image providing server 2 via the network 100 and the communication processing unit 300.

The image provision information receiving unit 686 receives image provision information from the image providing server 2 via the network 100 and the communication processing unit 300, and outputs the image provision information to the image display processing unit 686.

Based on the image provision information from the image display processing unit 686, the image display processing unit 688 performs processing necessary for displaying image information on the output device 148 that is a liquid crystal display screen or the like.

The image information to be displayed may be image names of image information or thumbnails of image data.

[Overall Operations of Image Display System 1]

Hereinafter, overall operations of the image display system 1 according to the fourth embodiment will be described.

Figure 18:
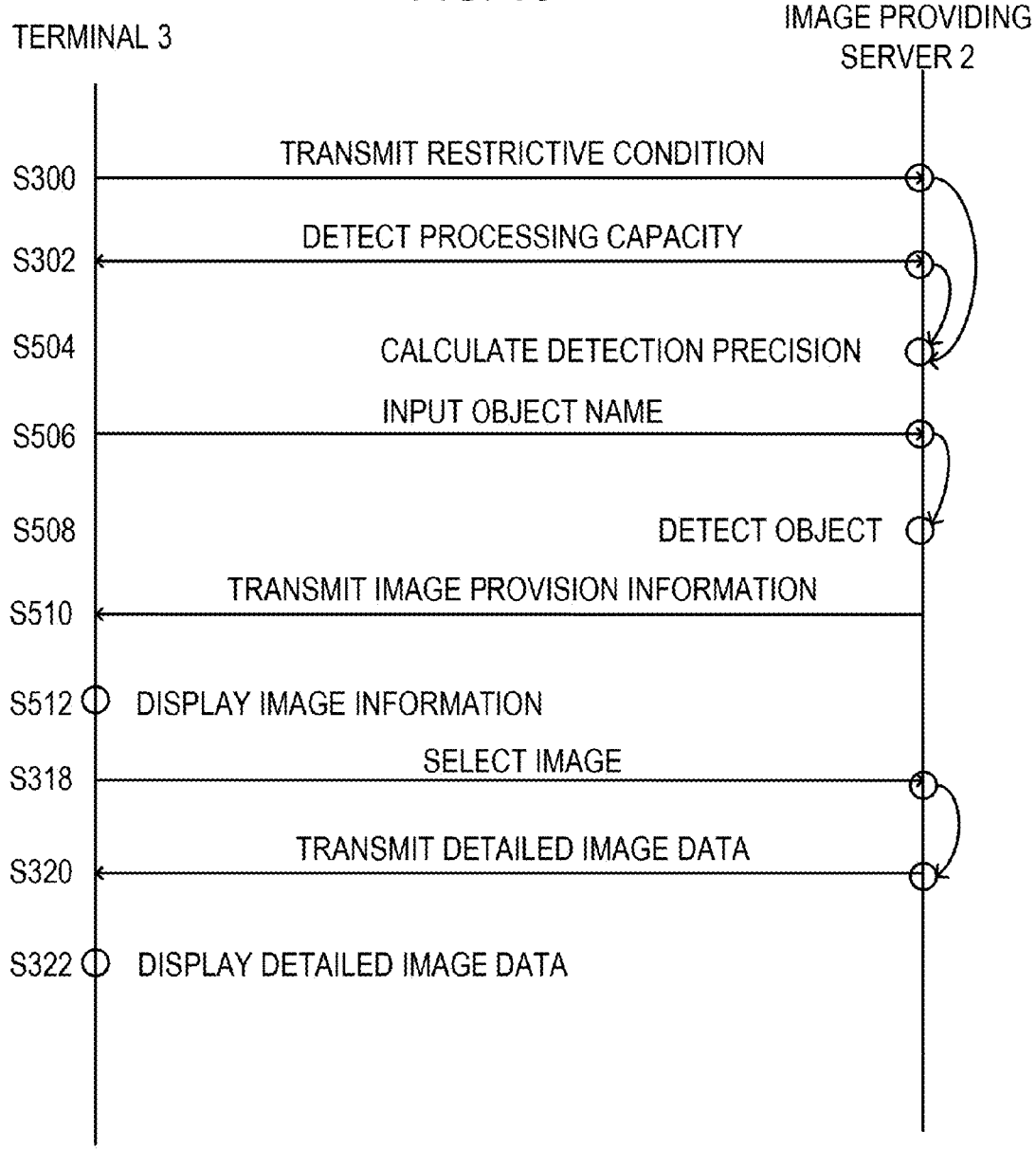
FIG. 18 is a communication sequence diagram illustrating overall operations of an image display system according to a fourth embodiment.

FIG. 18 is a communication sequence diagram illustrating overall operations (S50) of the image display system 1 according to the fourth embodiment.

As illustrated in FIG. 18, in step 500 (S500), the terminal 3 transmits restrictive condition information to the image providing server 2.

In step 502 (S502), the image providing server 2 detects current processing capacities of the terminal 3 and the image providing server 2 and a current communication capacity of a communication channel such as the network 100.

In step 504 (S504), the image providing server 2 calculates a detection precision based on the restrictive condition information and current processing capacities.

In step 506 (S506), the terminal 3 transmits an object name inputted by a user operation to the image providing server 2.

In step 508 (S508), the image providing server 2 detects a projection of an object corresponding to the designated object name from each image, and for each piece of image information, calculates the number of projections of the designated object included in the image of the image information.

In step 510 (S510), the image providing server 2 transmits image provision information to the terminal 3.

In step 512 (S512), the terminal 3 displays image information on the output device 148 based on the image provision information.

Moreover, when time limit is selected as restrictive condition information, the processing times of S506 to S512 are to be limited.

The embodiments described above have been presented by way of exemplification and illustration and do not encompass all possible embodiments of the disclosure of the present application.

In addition, the embodiments described above are not intended to limit the technical scope of the disclosure of the present application to the contents of the disclosure, and various changes and modifications can be made in light of the contents of the disclosure.

Furthermore, since the embodiments described above have been selected and described in order to best illustrate the principles disclosed and its practical applications, based on the contents of the disclosure of the embodiments, one skilled in the art can best utilize the disclosure of the present application and embodiments thereof with various modifications as are suited to all particular uses contemplated.

Moreover, it is intended that the technical scope of the disclosure of the present application be defined by the claims and equivalents thereof.

INDUSTRIAL APPLICABILITY

The disclosure of the present application can be utilized for displaying images.

DESCRIPTION OF SYMBOLS 1 image display system
100 network
102 base station
104 GPS satellite
2 image providing server
120 communication processing unit
140 CPU
142 memory
144 peripheral
146 input device
148 output device
152 recording apparatus
154 recording medium
3 terminal
150 camera
160 GPS
20 image providing server program
200 communication processing unit
202 user interface unit (UI)
204 image receiving unit
206 image information managing unit
208 image database (DB)
210 image inputting unit
212 image request receiving unit
214 image transmitting unit
22 second image providing server program
200 communication processing unit
222 image information managing unit
224 image database (DB)
24 analytical precision calculating module
242 restrictive condition receiving unit
244 image analytical precision calculating unit
246 processing capacity detecting unit
248 image-count detecting unit
26 image analyzing module
260 image component extracting unit
264 color classifying unit
266 color percentage calculating unit
262 image information acquiring unit
28 image providing module
280 image component receiving unit
282 image designation receiving unit
284 difference calculating unit
286 image sequence creating unit
288 image provision information transmitting unit
292 image selection receiving unit
294 detailed image data transmitting unit
60 fourth image providing server program
62 detection precision calculating module
622 restrictive condition inputting unit
624 detection precision calculating unit
626 processing capacity detecting unit
628 image-count detecting unit
64 detecting module
642 image information acquiring unit
644 object name receiving unit
646 object detecting unit
648 object-count calculating unit
66 image providing module
662 image sequence creating unit
664 image provision information transmitting unit
30 terminal program
300 communication processing unit
302 UI
32 image storing module
320 image acquiring unit
322 camera processing unit
324 image information managing unit
326 image DB
34 analytical precision calculating module
342 restrictive condition inputting unit
344 image analytical precision calculating unit
346 processing capacity detecting unit
348 image-count detecting unit
36 image analyzing module
360 image component extracting unit
364 color classifying unit
366 color percentage calculating unit
368 metadata acquiring unit
362 image information acquiring unit
38 image providing module
380 image component selecting unit
382 image designating unit
384 difference calculating unit
386 image sequence creating unit
388 image provision processing unit
392 image selecting unit
394 detailed image display processing unit
40 second terminal program
412 processing capacity detection receiving unit
414 processing capacity detecting unit
416 processing capacity information transmitting unit
422 restrictive condition inputting unit
424 restrictive condition transmitting unit
430 image component inputting unit
432 image component transmitting unit
436 image designation inputting unit
438 image designation transmitting unit
442 image provision information receiving unit
444 image display processing unit
452 image selection inputting unit
454 image selection transmitting unit
460 detailed image data receiving unit
462 detailed image display processing unit
50 third terminal program
52 detection precision calculating module
522 restrictive condition inputting unit
524 detection precision calculating unit
526 processing capacity detecting unit
528 image-count detecting unit
54 detecting module
542 image information acquiring unit
544 object name inputting unit
546 object detecting unit
548 object-count calculating unit
56 image providing module
562 image sequence creating unit
564 image provision processing unit
68 fourth terminal program 682 object name inputting unit
684 object name transmitting unit
686 image provision information receiving unit
688 image display processing unit

The invention claimed is:

1. An image display system comprising:
an image display apparatus; and
an image providing apparatus connected to the image display apparatus, the image providing apparatus providing the image display apparatus with one or more pieces of image information respectively including one or more components including information regarding color, time and position; wherein
the image providing apparatus includes:
a central processing unit and a memory;
a calculating module that calculates an analytical precision satisfying a restrictive condition designated for the provision of the one or more pieces of image information, based on current processing capacities of the image display apparatus and the image providing apparatus, a current communication processing capacity between the image display apparatus and the image providing apparatus, and an amount of information corresponding to the number of the one or more pieces of image information;
an analyzing module that analyzes the components of the respective pieces of image information with the calculated analytical precision, classifies colors used in the image information based on the analytical precision and calculates a percentage of each classified color; and
a providing module that receives an image designation and a designation of any one the components of color, time and position to create provision information by arranging the one or more pieces of image information so that image information other than the designated image is displayed in an order of analysis results of nearest to farthest from the image information of the designated image, and provides the provision information to the image display apparatus, the providing module creating, when color is designated from the components, provision information by arranging image information other than the designated image in an order of the calculated color percentages of nearest to farthest from the image information of the designated image; and
wherein the image display apparatus displays the provided provision information and image information included in the provision information;
wherein the restrictive condition is designated from any of time, power consumption and display screen size; and
wherein, when a time limit is designated as the restrictive condition,
the analytical precision is a function of an amount of information corresponding to the number of the one or more pieces of image information, a calculation time for one color in a piece of the image information, and the time limit,
the calculation time is a function of a current processing capacity of the image providing apparatus, and
the calculating module calculates the analytical precision such that the period of time from the moment the providing module receives an image designation to the moment the image display apparatus displays the provision information is equal to or within the designated time limit.

2. An image display apparatus that displays one or more pieces of image information respectively including one or more components, the image display apparatus comprising:
a central processing unit and a memory;
a calculating module that calculates an analytical precision satisfying a restrictive condition designated for the provision of the one or more pieces of image information;
an analyzing module that analyzes the components of the respective pieces of image information with the calculated analytical precision; and
a providing module that receives an image designation and a designation of the components, and creates and displays provision information in which image information other than the designated image is arranged in an order of analysis results of nearest to farthest from the image information of the designated image; and
wherein, when a time limit is designated as the restrictive condition,
the analytical precision is a function of an amount of information corresponding to the number of the one or more pieces of image information, a calculation time for one color in a piece of the image information, and the time limit,
the calculation time is a function of a current processing capacity of the image display apparatus, and
the calculating module calculates the analytical precision such that the period of time from the moment the providing module receives an image designation to the moment the image display apparatus displays the provision information is equal to or within the designated time limit.

3. The image display apparatus according to claim 2, wherein the restrictive condition is designated from any of time, power consumption and display screen size.

4. The image display apparatus according to claim 2, wherein
components of the image information include information regarding color, time and position, and
the providing module receives a designation of one type of information regarding color, time and position.

5. The image display apparatus according to claim 2, wherein
components of the image information include information regarding color,
the analyzing module analyzes colors of the image information, and
the providing module creates provision information by arranging image information other than the designated image in an order of colors of nearest to farthest from the image information of the designated image.

6. The image display apparatus according to claim 2, wherein
the analyzing module classifies colors used in the image information based on the analytical precision and calculates a percentage of the respective classified colors, and
the providing module creates provision information by arranging image information other than the designated image in an order of the calculated color percentages of nearest to farthest from the image information of the designated image.

7. An image display system comprising:
an image display apparatus and
an image providing apparatus connected to the image display apparatus, the image providing apparatus providing the image display apparatus with one or more pieces of image information respectively including one or more components; wherein
the image providing apparatus includes:
a central processing unit and a memory;

a calculating module that calculates an analytical precision satisfying a restrictive condition designated for the provision of the one or more pieces of image information;

an analyzing module that analyzes the components of the respective pieces of image information with the calculated analytical precision;

and a providing module that receives an image designation and a designation of the components, creates provision information in which image information other than the designated image is arranged in an order of analysis results of nearest to farthest from the image information of the designated image, and provides the provision information to the image display apparatus; and wherein the image display apparatus displays the provided provision information and image information included in the provision information, and wherein, when a time limit is designated as the restrictive condition, the analytical precision is a function of an amount of information corresponding to the number of the one or more pieces of image information, a calculation time for one color in a piece of the image information, and the time limit, the calculation time is a function of a current processing capacity of the image providing apparatus, and the calculating module calculates the analytical precision such that the period of time from the moment the providing module receives an image designation to the moment the display apparatus displays the provision information is equal to or within the designated time limit.

8. The image display system according to claim 7, wherein the calculating module calculates the analytical precision based on current processing capacities of the image display apparatus and the image providing apparatus and a current communication processing capacity between the image display apparatus and the image providing apparatus.

9. The image display system according to claim 7, wherein the restrictive condition is designated from any of time, power consumption and display screen size.

10. The image display system according to claim 7, wherein components of the image information include information regarding color, time and position, and the providing module receives a designation of one type of information regarding color, time and position.

11. The image display system according to claim 7, wherein components of the image information include information regarding color, the analyzing module analyzes colors of the image information, and the providing module creates provision information by arranging image information other than the designated image in an order of colors of nearest to farthest from the image information of the designated image.

12. The image display system according to claim 7, wherein the analyzing module classifies colors used in the image information based on the analytical precision and calculates a percentage of the respective classified colors, and the providing module creates provision information by arranging image information other than the designated image in an order of the calculated color percentages of nearest to farthest from the image information of the designated image.

13. An image providing apparatus connected to the image display apparatus, the image providing apparatus providing the image display apparatus with one or more pieces of image information respectively including one or more components, wherein the image providing apparatus comprises:

a central processing unit and a memory;

a calculating module that calculates an analytical precision satisfying a restrictive condition designated for the provision of the one or more pieces of image information;

an analyzing module that analyzes the components of the image respective pieces of information with the calculated analytical precision; and a providing module that receives an image designation and a designation of the components, creates provision information in which image information other than the designated image is arranged in an order of analysis results of nearest to farthest from the image information of the designated image, and provides the provision information to the image display apparatus; and wherein, when a time limit is designated as the restrictive condition, the analytical precision is a function of an amount of information corresponding to the number of the one or more pieces of image information, a calculation time for one color in a piece of the image information, and the time limit, the calculation time is a function of a current processing capacity of the image providing apparatus, and the calculating module calculates the analytical precision such that the period of time from the moment the providing module receives an image designation to the moment the image display apparatus displays the provision information is equal to or within the designated time limit.

14. An image display method executed by an image display apparatus and an image providing apparatus connected to the image display apparatus, the image providing apparatus providing the image display apparatus with one or more pieces of image information respectively including one or more components, the image display method comprising:

the image providing apparatus, including a central processing unit and a memory, calculating an analytical precision satisfying a restrictive condition designated for the provision of the one or more pieces of image information;

the image providing apparatus analyzing the components of the respective pieces of image information with the calculated analytical precision;

the image providing apparatus receiving an image designation and a designation of the components, creating provision information in which image information other than the designated image is arranged in an order of analysis results of nearest to farthest from the image information of the designated image, and providing the provision information to the image display apparatus; and the image display apparatus displaying the provided provision information and image information included in the provision information; and wherein, when a time limit is designated as the restrictive condition, the analytical precision is a function of an amount of information corresponding to the number of the one or more pieces of image information, a calculation time for one color in a piece of the image information, and the time limit, the calculation time is a function of a current processing capacity of the image providing apparatus, and the image providing apparatus calculates the analytical precision such that the period of time from the moment the providing apparatus receives an image designation to the moment the display apparatus displays the provision information is equal to or within the designated time limit.

15. An image providing method executed by an image providing apparatus connected to an image display apparatus, the image providing apparatus providing the image display apparatus with one or more pieces of image information respectively including one or more components, the image providing method comprising:

calculating an analytical precision satisfying a restrictive condition designated for the provision of the one or more pieces of image information;

analyzing the components of the respective pieces of image information with the calculated analytical precision;

receiving an image designation and designation of the components, creating provision information in which image information other than the designated image is arranged in an order of analysis results of nearest to farthest from the image information of the designated image, and providing the provision information to the image display apparatus; and wherein, when a time limit is designated as the restrictive condition, the analytical precision is a function of an amount of information corresponding to the number of the one or more pieces of image information, a calculation time for one color in a piece of the image information, and the time limit, the calculation time is a function of a current processing capacity of the image providing apparatus, and an image providing apparatus, including a central processing unit and a memory, calculates the analytical precision such that the period of time from the moment the providing apparatus receives an image designation to the moment the image display apparatus displays the provision information is equal to or within the designated time limit.

\* \* \* \* \*

UNITED STATES PATENT AND TRADEMARK OFFICE
CERTIFICATE OF CORRECTION

PATENT NO. : 8,013,866 B2
APPLICATION NO. : 12/665153
DATED : September 6, 2011
INVENTOR(S) : Yoshida et al.

Page 1 of 1

It is certified that error appears in the above-identified patent and that said Letters Patent is hereby corrected as shown below:

In the Drawings:

In Fig. 8, Sheet 9 of 19, delete "IMAGE DAT" and insert -- IMAGE DATA --, therefor.

In Fig. 11, Sheet 12 of 19, delete "FROM3" and insert -- FROM 3 --, therefor.

In Fig. 18, Sheet 19 of 19, delete "S300" and insert -- S500 --, therefor.

In Fig. 18, Sheet 19 of 19, delete "S302" and insert -- S502 --, therefor.

In the Claims:

In Column 27, Line 32, in Claim 1, delete "any one the" and
insert -- any one of the --, therefor.

Signed and Sealed this
Eleventh Day of June, 2013

Teresa Stanek Rea
*Acting Director of the United States Patent and Trademark Office*